US012568236B2

(12) United States Patent
Jiang et al.

(10) Patent No.: US 12,568,236 B2
(45) Date of Patent: Mar. 3, 2026

(54) VIDEO COMPRESSION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Aojie Jiang, Shenzhen (CN); Xianguo Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 258 days.

(21) Appl. No.: 18/235,131

(22) Filed: Aug. 17, 2023

(65) Prior Publication Data

US 2023/0396787 A1 Dec. 7, 2023

Related U.S. Application Data

(63) Continuation of application No. PCT/CN2022/119175, filed on Sep. 16, 2022.

(30) Foreign Application Priority Data

Nov. 10, 2021 (CN) .......................... 202111327815.7

(51) Int. Cl.
*H04N 11/02* (2006.01)
*H04N 19/119* (2014.01)
(Continued)

(52) U.S. Cl.
CPC ......... *H04N 19/436* (2014.11); *H04N 19/119* (2014.11); *H04N 19/137* (2014.11);
(Continued)

(58) Field of Classification Search
CPC .................................................. H04N 19/436
(Continued)

(56) References Cited

U.S. PATENT DOCUMENTS 10,827,178 B2 * 11/2020 Nellore ................ H04N 19/174
2014/0086306 A1 * 3/2014 Esenlik .................. H04N 19/46
375/240.02
(Continued)

FOREIGN PATENT DOCUMENTS

CN 103702126 A 4/2014
CN 103974081 A 8/2014
(Continued)

OTHER PUBLICATIONS

The World Intellectual Property Organization (WIPO) International Search Report and Written Opinion for PCT/CN2022/119175 Dec. 5, 2022 13 Pages (including translation).
(Continued)

*Primary Examiner* — Leron Beck
(74) *Attorney, Agent, or Firm* — Anova Law Group, PLLC

(57) ABSTRACT

A video compression method includes: acquiring a video to be compressed; determining encoding parameters respectively corresponding to a plurality of image frames in the video; and compressing the video based on the encoding parameters respectively corresponding to the plurality of image frames in the video. Determining encoding parameters respectively corresponding to a plurality of image frames in the video includes: for an image frame of a plurality of image frames: performing adaptive mapping on the image frame based on a differential feature of the image frame relative to a corresponding reference frame, to obtain a mapping result; determining a parallel processing condition corresponding to the image frame according to the
(Continued)

302
Determine an adaptive mapping parameter and a result limit range, the result limit range being obtained based on a picture group feature of a group of pictures to which an image frame belongs 304
Perform adaptive mapping on a differential feature of the image frame relative to a corresponding reference frame according to the adaptive mapping parameter to obtain a differential feature mapping result 306
Adjust the differential feature mapping result based on the result limit range to obtain a mapping result within the result limit range 308
Determine a parallel processing threshold according to the mapping result, and generate a parallel processing condition corresponding to the image frame based on the parallel processing threshold mapping result; performing, in response to that a hierarchical feature of the image frame satisfies the parallel processing condition, parallel compression analysis on image encoding units in the image frame to obtain an encoding parameter for the image frame.

20 Claims, 8 Drawing Sheets

(51) Int. Cl.

| | |
|---|---|
| *H04N 19/137* | (2014.01) |
| *H04N 19/172* | (2014.01) |
| *H04N 19/176* | (2014.01) |
| *H04N 19/177* | (2014.01) |
| *H04N 19/436* | (2014.01) |
| *H04N 19/463* | (2014.01) |

(52) U.S. Cl.
CPC ......... *H04N 19/172* (2014.11); *H04N 19/176* (2014.11); *H04N 19/177* (2014.11); *H04N 19/463* (2014.11)

(58) Field of Classification Search
USPC .......................................... 375/240.01–240.29
See application file for complete search history.

(56) References Cited

U.S. PATENT DOCUMENTS

| | | | | |
|---|---|---|---|---|
| 2014/0247875 A1* | 9/2014 | Hattori | ................... | H04N 19/86 |
| | | | | 375/240.12 |
| 2014/0341276 A1* | 11/2014 | Lee | ...................... | H04N 19/463 |
| | | | | 375/240.03 |
| 2015/0103927 A1* | 4/2015 | Hannuksela | ......... | H04N 19/159 |
| | | | | 375/240.26 |
| 2016/0191922 A1 | 6/2016 | Chao et al. | | |
| 2016/0301942 A1* | 10/2016 | Qiu | ....................... | H04N 19/40 |
| 2017/0118466 A1* | 4/2017 | Nakagami | ........... | H04N 19/134 |
| 2017/0310983 A1 | 10/2017 | Gudumasu et al. | | |
| 2019/0082178 A1 | 3/2019 | Kim et al. | | |
| 2019/0342560 A1 | 11/2019 | Schierl et al. | | |
| 2022/0201311 A1* | 6/2022 | Zhang | ................. | H04N 19/105 |
| 2024/0155141 A1 | 5/2024 | Schierl et al. | | |

FOREIGN PATENT DOCUMENTS

| | | |
|---|---|---|
| CN | 104620584 A | 5/2015 |
| CN | 105847871 A | 8/2016 |
| CN | 109076216 A | 12/2018 |
| WO | 2018155983 A1 | 8/2018 |

OTHER PUBLICATIONS

The European Patent Office (EPO) The Extended European Search Report for Application No. 22891638.3 Jan. 27, 2025 10 Pages.
China National Intellectual Property Administration (CNIPA) Office Action 1 for Application No. 202111327815.7 Mar. 21, 2025 9 Pages (including translation).

* cited by examiner

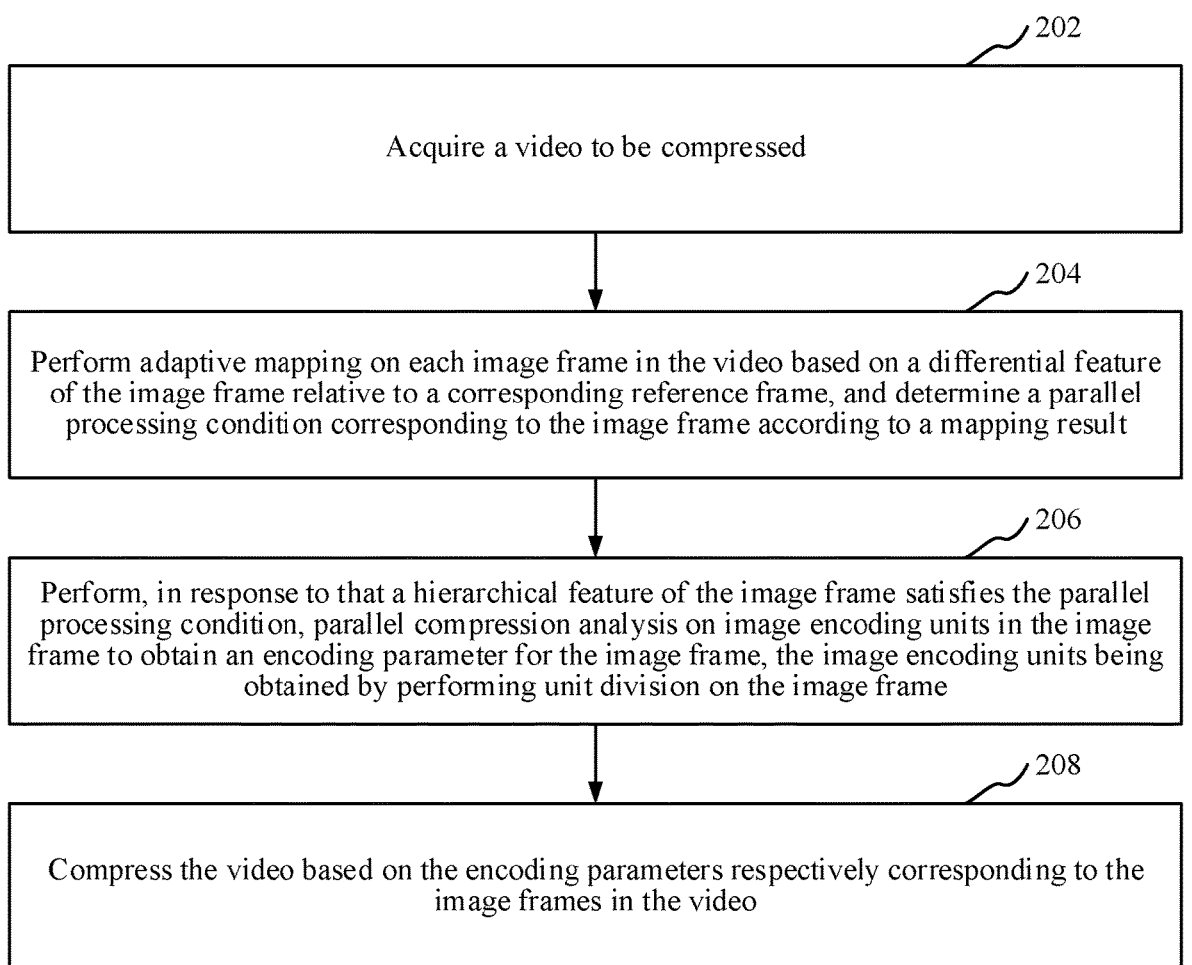

202

Acquire a video to be compressed

204

Perform adaptive mapping on each image frame in the video based on a differential feature of the image frame relative to a corresponding reference frame, and determine a parallel processing condition corresponding to the image frame according to a mapping result

206

Perform, in response to that a hierarchical feature of the image frame satisfies the parallel processing condition, parallel compression analysis on image encoding units in the image frame to obtain an encoding parameter for the image frame, the image encoding units being obtained by performing unit division on the image frame

208

Compress the video based on the encoding parameters respectively corresponding to the image frames in the video

FIG. 2

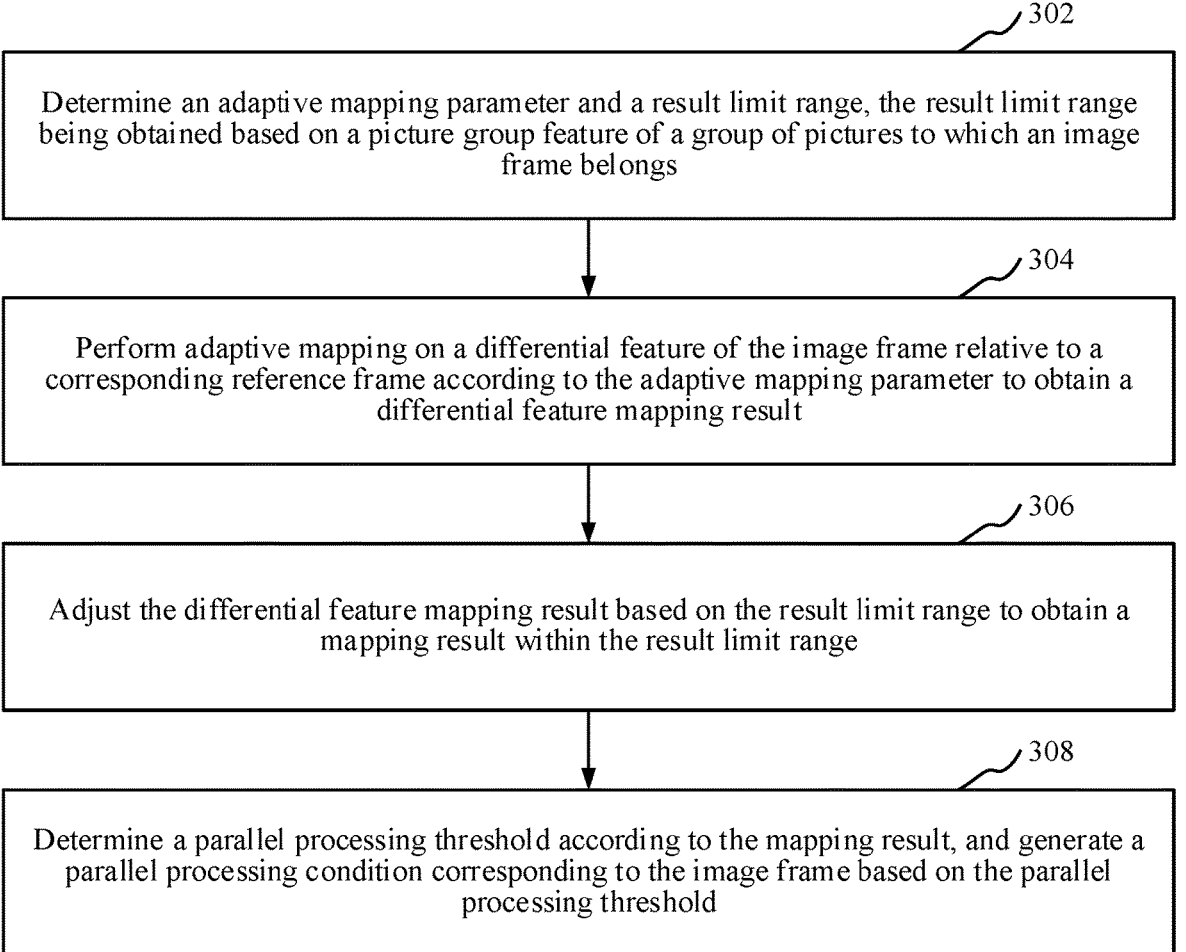

Determine an adaptive mapping parameter and a result limit range, the result limit range being obtained based on a picture group feature of a group of pictures to which an image frame belongs
302

Perform adaptive mapping on a differential feature of the image frame relative to a corresponding reference frame according to the adaptive mapping parameter to obtain a differential feature mapping result
304

Adjust the differential feature mapping result based on the result limit range to obtain a mapping result within the result limit range
306

Determine a parallel processing threshold according to the mapping result, and generate a parallel processing condition corresponding to the image frame based on the parallel processing threshold
308

FIG. 3

|  | Tile |  |
|---|---|---|
|  |  |  |
|  |  |  |

FIG. 6

| (x-1, y-1) | (x-1, y) | (x-1, y+1) |
|---|---|---|
| (x, y-1) | (x, y) | |

FIG. 7

| (0, 0) | (0, 1) | (0, 2) | (0, 3) | (0, 4) |
|---|---|---|---|---|
| (1, 0) | (1, 1) | (1, 2) | | |
| (2, 0) | | | | |

VIDEO COMPRESSION METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2022/119175, filed on Sep. 16, 2022, which claims priority to Chinese Patent Application No. 202111327815.7, entitled "VIDEO COMPRESSION METHOD AND APPARATUS, COMPUTER DEVICE, AND STORAGE MEDIUM" filed with the China National Intellectual Property Administration on Nov. 10, 2021, the entire contents of both of which are incorporated herein by reference.

FIELD OF THE TECHNOLOGY

The present disclosure relates to the field of computer technologies, and in particular, to a video compression method and apparatus, a computer device, a storage medium, and a computer program product.

BACKGROUND

With the development of computer technologies, videos are constantly developing in the direction of high-definition, high frame rate, and high resolution, and the data volume of a video is also increasing. In order to facilitate the storage and transmission of videos, effective compression of videos is becoming more and more important. Video compression refers to a process of reducing a storage capacity required for representing an original video by removing redundant information from a digital video through compression, so as to facilitate the transmission and storage of video data.

Currently, during compression of a video, the video compression efficiency is improved through parallel compression. However, when video compression is accelerated through parallelism, a large compression performance loss is often introduced, resulting in a low video compression performance.

SUMMARY

Various embodiments of the present disclosure provide a video compression method and apparatus, a computer device, a storage medium, and a computer program product.

A video compression method is performed by a computer device and includes: acquiring a video to be compressed; determining encoding parameters respectively corresponding to a plurality of image frames in the video; and compressing the video based on the encoding parameters respectively corresponding to the plurality of image frames in the video. Determining encoding parameters respectively corresponding to a plurality of image frames in the video includes: for an image frame of a plurality of image frames: performing adaptive mapping on the image frame based on a differential feature of the image frame relative to a corresponding reference frame, to obtain a mapping result; determining a parallel processing condition corresponding to the image frame according to the mapping result; performing, in response to that a hierarchical feature of the image frame satisfies the parallel processing condition, parallel compression analysis on image encoding units in the image frame to obtain an encoding parameter for the image frame, the image encoding units being obtained by performing unit division on the image frame.

A video compression apparatus includes: a video acquisition module, configured to acquire a video to be compressed; a parallel condition determination module, configured to perform adaptive mapping on each image frame in the video based on a differential feature of the image frame relative to a corresponding reference frame, and determine a parallel processing condition corresponding to the image frame according to a mapping result; an encoding parameter determination module, configured to perform, in response to that a hierarchical feature of the image frame satisfies the parallel processing condition, parallel compression analysis on image encoding units in the image frame to obtain an encoding parameter for the image frame, the image encoding units being obtained by performing unit division on the image frame; and a video compression module, configured to compress the video based on the encoding parameters respectively corresponding to the image frames in the video.

A computer device includes at least one memory and at least one processor, the at least one memory storing a computer-readable instruction that, when executed by the at least one processor, implements the following steps: acquiring a video to be compressed; determining encoding parameters respectively corresponding to a plurality of image frames in the video; and compressing the video based on the encoding parameters respectively corresponding to the plurality of image frames in the video. Determining encoding parameters respectively corresponding to a plurality of image frames in the video includes: for an image frame of a plurality of image frames: performing adaptive mapping on the image frame based on a differential feature of the image frame relative to a corresponding reference frame, to obtain a mapping result; determining a parallel processing condition corresponding to the image frame according to the mapping result; performing, in response to that a hierarchical feature of the image frame satisfies the parallel processing condition, parallel compression analysis on image encoding units in the image frame to obtain an encoding parameter for the image frame, the image encoding units being obtained by performing unit division on the image frame.

A non-transitory computer-readable storage medium stores a computer-readable instruction that, when executed by at least one processor, causing the at least one processor to implement: acquiring a video to be compressed; determining encoding parameters respectively corresponding to a plurality of image frames in the video; and compressing the video based on the encoding parameters respectively corresponding to the plurality of image frames in the video. Determining encoding parameters respectively corresponding to a plurality of image frames in the video includes: for an image frame of a plurality of image frames: performing adaptive mapping on the image frame based on a differential feature of the image frame relative to a corresponding reference frame, to obtain a mapping result; determining a parallel processing condition corresponding to the image frame according to the mapping result; performing, in response to that a hierarchical feature of the image frame satisfies the parallel processing condition, parallel compression analysis on image encoding units in the image frame to obtain an encoding parameter for the image frame, the image encoding units being obtained by performing unit division on the image frame.

Details of one or more embodiments of the present disclosure are provided in the following drawings and description. Other features, objectives, and advantages of the present disclosure will become apparent from the description, the drawings, and the claims.

BRIEF DESCRIPTION OF THE DRAWINGS

In order to describe the technical solutions in the embodiments of the present disclosure or the related technology more clearly, the drawings need to be used in the description of the embodiments or the related technology will be briefly introduced below. Obviously, the drawings in the following description are only some embodiments of the present disclosure.

FIG. 2 is a schematic flowchart of a video compression method according to an embodiment.

FIG. 3 is a schematic flowchart of determination of a parallel processing condition according to an embodiment.

FIG. 6 is a schematic diagram of tile-level parallel processing.

FIG. 7 is a schematic diagram of a dependence relationship between coding tree units during wavefront parallel processing according to an embodiment.

FIG. 8 is a schematic diagram of parallel processing of coding tree units during wavefront parallel processing according to an embodiment.

DESCRIPTION OF EMBODIMENTS

In order to make the objectives, technical solutions, and advantages of the present disclosure clearer, the present disclosure will be further described in detail below with reference to the drawings and the embodiments. It is to be understood that the specific embodiments described herein are only used for explaining the present disclosure, and are not used for limiting the present disclosure.

Figure 1:
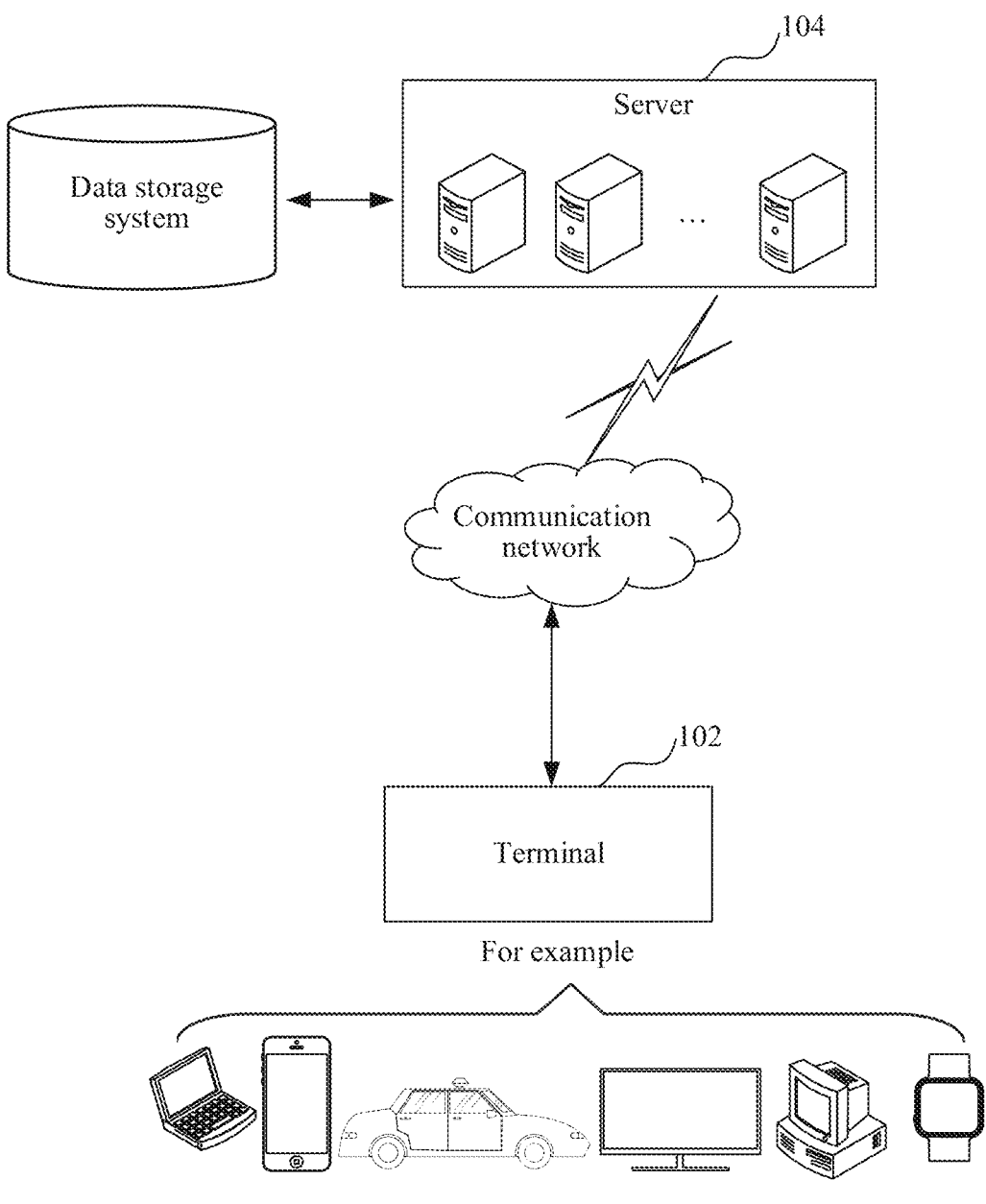
FIG. 1 is a diagram of an application environment of a video compression method according to an embodiment.

A video compression method of the present disclosure may be applied to an application environment shown in FIG. 1. A terminal 102 communicates with a server 104 via a network. A data storage system may store data required to be processed by the server 104. The data storage system may be integrated in the server 104, or may be deployed on the cloud or another network server. The terminal 102 may be provided with a shooting apparatus such as a camera. The terminal 102 may shoot a video and transmit the shot video to the server 104. The server 104 performs adaptive mapping on each image frame in the received to-be-compressed video based on a differential feature of the image frame relative to a corresponding reference frame to obtain a mapping result, determines a parallel processing condition corresponding to the image frame according to the mapping result, performs, in response to that a hierarchical feature of the image frame satisfies the parallel processing condition, parallel compression analysis on image encoding units, obtained by unit division, in the image frame to obtain an encoding parameter for the image frame, and compresses the video based on the encoding parameters respectively corresponding to the image frames in the video.

In addition, video compression may also be implemented by the terminal 102 or the server 104 alone. For example, after shooting a video, the terminal 102 may directly compress the video to facilitate the transmission and storage of the video. For another example, the server 104 may directly acquire a video to be compressed from a server database and compress the video. The terminal 102 may be, but is not limited to, any personal computer, notebook computer, smartphone, tablet computer, on-board device or portable wearable device, and the server 104 may be implemented by an independent server or a server cluster composed of multiple servers.

In an embodiment, as shown in FIG. 2, a video compression method is provided, which may be performed by a computer device. In this embodiment, the description is made by taking a case where the method is applied to the server in FIG. 1 as an example, and the method includes the following steps.

Step 202: Acquire a video to be compressed.

The to-be-compressed video may be shot by using a shooting device, and specifically, may be shot by using a terminal with a shooting function. A capacity of an original video shot by using the shooting device is often large, which does not facilitate the transmission and storage of the video. Through video compression, redundant information may be effectively removed from the video to reduce the capacity of the video, so as to facilitate the transmission and storage of the video.

Specifically, the server acquires the to-be-compressed video. Specifically, the server may receive a to-be-compressed video transmitted by the terminal. For example, in a video application or website, a user uploads a video shot by using the terminal to a video sharing platform such as the video application or website, and the server receives the video uploaded by the terminal and takes the video as a to-be-compressed video for compression. In one embodiment, in response to that an original video is stored in a database, the server may also directly acquire the to-be-compressed video from the database.

Step 204: Perform adaptive mapping on each image frame in the video based on a differential feature of the image frame relative to a corresponding reference frame, and determine a parallel processing condition corresponding to the image frame according to a mapping result.

The video is a successive image sequence and is composed of successive image frames, and one image frame is one image. The image frame is a frame of image that makes up the video. For adjacent image frames in the video, a difference between the frames of images is small, that is, a change between the image frames is small, and redundant information is large. In this case, for a segment with a small image frame change in the video, one image frame in the segment may be completely encoded, differences between other image frames in the segment and the completely encoded image frame are small, and for other image frames, only a part different from the completely encoded image frame may be encoded, so as to compress the video without completely encoding the image frames. The completely encoded image frame is the reference frame of other image frames in the segment, that is, other image frames are encoded by taking the completely encoded image frame as a reference, or may be decoded by taking the completely encoded image frame as a reference, so as to restore the original image frame. For example, for 8 consecutive frames of images in a video, a change between the 8 frames of images is small, the 8 frames of images may be taken as a group of pictures, and one frame is selected from the group of pictures as a reference frame and completely encoded. For example, the first frame is taken as a reference frame and completely encoded, all the remaining 7 frames of images take the first frame as the reference frame, and differences between the frames of images and the first frame are encoded to encode the frames of images, so as to compress the video.

The reference frame is an image frame that is taken as a reference for encoding and decoding of other image frames, and specifically, may be an image frame taken as a reference for encoding and decoding of other image frames in a group of pictures. The differential feature is used for characterizing a difference between the image frame and the corresponding reference frame, and specifically, may be obtained according to a picture change between the image frame and the corresponding reference frame. For example, the differential feature may be obtained according to an object difference or a pixel difference between the image frame and the corresponding reference frame. Adaptive mapping refers to mapping based on the differential feature of the image frame relative to the corresponding reference frame, that is, a mapping result of the adaptive mapping is associated with the differential feature of the image frame relative to the corresponding reference frame, so that the difference between the image frame and the corresponding reference frame is further characterized by the mapping result of the adaptive mapping and accordingly the parallel processing condition corresponding to the image frame is determined. The parallel processing condition is used for determining whether parallel processing needs to be performed on the image frame, and specifically, may be correspondingly set according to the mapping result. Different types of mapping results may correspond to different parallel processing conditions. For example, in response to that the mapping result is numerical data, the parallel processing condition may be set as a threshold determination condition based on the numerical type, so that the parallel processing condition of the image frame is obtained according to the mapping result. For another example, in response to that the mapping result is data of level classification type, the parallel processing condition may be set as a determination condition satisfying a high level or a low level.

The parallel processing condition is determined according to the mapping result of the adaptive mapping performed on the differential feature of the image frame relative to the corresponding reference frame, differential features of different image frames relative to the corresponding reference frame are different, and mapping results of adaptive mapping are different, so that different parallel processing conditions are determined. The parallel processing condition is adaptively determined according to the image feature, and whether to perform parallel processing on the image frame is determined based on the parallel processing condition. The video frames in the to-be-compressed video may be flexibly encoded, which reduces an introduced compression performance loss, and ensures the video compression performance, that is, ensures that the compressed video may be accurately restored. For example, if the adaptive mapping is linear mapping, the larger the difference between the image frame and the corresponding reference frame is, the larger the difference between the image frame and the corresponding reference frame that is characterized by the mapping result is. In this case, if parallel acceleration is performed, more compression performance losses may be introduced, resulting in that the encoded image frame cannot be accurately restored. It may be determined that parallel acceleration is not performed on the image frame according to the parallel processing condition, so that the encoded image frame may be accurately restored to ensure the video compression performance.

Specifically, after obtaining the to-be-compressed video, the server may determine, for each image frame in the video, a reference frame corresponding to the image frame according to a reference relationship between the image frames, further determine a differential feature of the image frame relative to the corresponding reference frame, perform adaptive mapping, such as linear mapping or non-linear mapping, on the differential feature to obtain a mapping result, and determine a parallel processing condition corresponding to the image frame based on the mapping result. The parallel processing condition is used for determining whether parallel processing needs to be performed on the image frame.

In one embodiment, the server may perform adaptive mapping by traversing the video from the first image frame of the to-be-compressed video to determine parallel processing conditions respectively corresponding to the image frames. For example, the server extracts one image frame from the to-be-compressed video as a current image frame, determines a reference frame of the current image frame, performs adaptive mapping based on a differential feature of the current image frame relative to the reference frame to obtain a current mapping result, determines a parallel processing condition corresponding to the current mapped frame according to the current mapping result, and processes the current image frame based on the parallel processing condition. After processing the current image frame, the server extracts a next frame from the video and processes the next frame until all image frames in the video are traversed to obtain parallel processing conditions respectively corresponding to the image frames. In addition, if the current image frames extracted by the server from the video is a reference frame, it is indicated that the current image frame needs to be completely encoded without compressing. Adaptive mapping may be performed on an image frame taking the current image frame as the reference frame, and a corresponding parallel processing condition is determined based on a mapping result.

Step 206: Perform, in response to that a hierarchical feature of the image frame satisfies the parallel processing condition, parallel compression analysis on image encoding units in the image frame to obtain an encoding parameter for the image frame, the image encoding units being obtained by performing unit division on the image frame.

The hierarchical feature is used for characterizing hierarchical information of the image frame in a group of pictures to which the image frame belongs. In one group of pictures, a reference frame is completely encoded, other image frames in the group of pictures take the reference frame as a reference, and differences between other image frames and the reference frame are encoded. In response to that the group of pictures includes multiple reference frames or the image frames respectively refer to multiple image frames, a hierarchical reference relationship is formed between the image frames. The hierarchical feature of the image frame may be used for describing a reference relationship of the image frame in the corresponding group of pictures to which the image frame belongs. For example, for a group of pictures including 7 image frames, the first frame may be a completely encoded image frame, both the fourth frame and the seventh frame take the first frame as a reference frame, both the second frame and the third frame take the first frame and the fourth frame as reference frames, that is, both the second frame and the third frame include two reference frames: the first frame and the fourth frame, and both the fifth frame and the sixth frame take the first frame and the seventh frame as reference frames, that is, both the fifth frame and the sixth frame also include two reference frames: the first frame and the seventh frame. A 3-layer hierarchical reference relationship is formed in the group of pictures, and hierarchical features of the image frames may be obtained according to layers corresponding to the image frames. For example, in response to that layers of the reference relationship are represented by continuous natural numbers, the layers corresponding to the image frames may be directly taken as the hierarchical features. The hierarchical feature of the image frame reflects depth of a layer where the image frame is located in the group of pictures. Generally, the higher the depth of layer is, the more the corresponding reference frames are, the lower the importance of the image frame as a reference is, and the smaller the influence on the video compression performance is. Therefore, the parallel compression efficiency of the image frame may be improved.

The image encoding units are obtained by performing unit division on the image frame, and specifically, may be obtained by performing unit division on the image frame by different unit division methods. For example, the image frame is divided into coding tree units (CTUs) based on a wavefront parallel processing (WPP) algorithm, or may be divided into Slices or Tiles, or the like. The parallel compression analysis refers to performing compression analysis on the image encoding units in the image frame in parallel to determine encoding parameters respectively corresponding to the image encoding units, so as to obtain an encoding parameter for the image frame. The encoding parameter is a related parameter for encoding the image frame, and specifically, may include, but is not limited to, a division mode, a residual parameter, a size of a divided block, and the like.

Specifically, after determining the parallel processing condition, the server further determines a hierarchical feature of the image frame. Specifically, the hierarchical feature of the image frame may be determined according to a hierarchical reference relationship of the image frame in a group of pictures to which the image frame belongs. The server compares the hierarchical feature of the image frame with the corresponding parallel processing condition, and if the hierarchical feature of the image frame satisfies the parallel processing condition, for example, the hierarchical feature of the image frame is greater than a parallel processing threshold in the parallel processing condition, it is indicated that parallel processing may be performed for the image frame, which may improve the processing efficiency and ensure that the image frame can be accurately restored. The server performs parallel compression analysis on image encoding units in the image frame, and the image encoding units are obtained by performing unit division on the image frame. The server takes the image encoding units in the image frame as parallel units, and performs parallel compression analysis on the image encoding units in the image frame by simultaneously performing parallel processing on multiple independent image encoding units to obtain encoding parameters respectively corresponding to the image encoding units, so as to obtain an encoding parameter for the image frame. The encoding parameter is used for encoding the image frame to compress the video.

Step 208: Compress the video based on the encoding parameters respectively corresponding to the image frames in the video.

The video includes multiple image frames, for each image frame, an encoding parameter corresponding to the image frame is determined, and the video is compressed based on the encoding parameters respectively corresponding to the image frames in the video. Specifically, the server may obtain encoding parameters respectively corresponding to the image frames in the video, and compress the video based on the encoding parameters respectively corresponding to the image frames. In one embodiment, the server may determine an encoding parameter corresponding to each image frame, encode the image frame based on the encoding parameter, and circularly perform encoding parameter determination and encoding on a next frame after encoding the image frame until all image frames in the video are traversed, so as to compress the video.

In one embodiment, in the image frames in the video, for an image frame that satisfies the corresponding parallel processing condition, a corresponding encoding parameter may be obtained based on parallel compression analysis, and for an image frame that does not satisfy the corresponding parallel processing condition, a corresponding encoding parameter may be determined based on non-parallel compression analysis. Specifically, the server extracts image frames in sequence from the video, determines, for an extracted current image frame, a reference frame corresponding to the current image frame, further determines a differential feature of the current image frame relative to the reference frame, performs adaptive mapping on the differential feature to obtain a mapping result, and determines a parallel processing condition corresponding to the current image frame based on the mapping result. The server determines a hierarchical feature of the current image frame according to a reference relationship of the current image frame in a group of pictures to which the current image frame belongs, determines, in response to that it is determined that the hierarchical feature of the current image frame satisfies the parallel processing condition, image encoding units obtained by performing unit division on the current image frame, performs parallel compression analysis on the image encoding units to obtain an encoding parameter for the current image frame, and encodes the current image frame based on the encoding parameter to compress the current image frame. The server extracts a next image frame from the video and process the next image frame as a new current image frame. If the hierarchical feature of the current image frame does not satisfy the parallel processing condition, the server may determine the encoding parameter for the image frame by other methods. For example, compression analysis may be performed on the image encoding units in the image frame in sequence to determine the encoding parameter for the current image frame, and encoding compression is performed on the current image based on the encoding parameter. After the server traverses all image frames in the video, the image frames in the video are encoded, and a capacity is reduced, so that the video is compressed.

In the foregoing video compression method, for each image frame in the to-be-compressed video, the parallel processing condition corresponding to the image frame is determined according to the mapping result of the adaptive mapping performed on the differential feature of the image frame relative to the corresponding reference frame, in case that the hierarchical feature of the image frame satisfies the parallel processing condition, parallel compression analysis is performed on the image encoding units obtained by performing unit division on the image frame to obtain the encoding parameter for the image frame, and the video is compressed based on the encoding parameters respectively corresponding to the image frames in the video. During compression of a video, corresponding parallel processing conditions are determined for image frames, parallel compression analysis is performed on image encoding units in an image frame in response to that the image frame satisfies the corresponding parallel processing condition to obtain an encoding parameter, and the video is compressed based on the encoding parameters respectively corresponding to the image frames. Parallel compression analysis may be adaptively performed for the image frames in the video, which reduces an introduced compression performance loss, improves the video compression efficiency, and ensures the video compression performance.

In an embodiment, as shown in FIG. 3, the operation of determining a parallel processing condition, that is, the operation of performing adaptive mapping based on a differential feature of the image frame relative to a corresponding reference frame, and determining a parallel processing condition corresponding to the image frame according to a mapping result, includes the following steps.

Step 302: Determine an adaptive mapping parameter and a result limit range, the result limit range being obtained based on a picture group feature of a group of pictures to which the image frame belongs.

The adaptive mapping parameter is used for performing adaptive mapping on the differential feature of the image frame relative to the corresponding reference frame. For example, in response to that the adaptive mapping performed on the differential feature of the image frame relative to the corresponding reference frame is linear mapping, the adaptive mapping parameter may be a parameter corresponding to the linear mapping. The adaptive mapping parameter may be flexibly set according to an actual requirement. The result limit range is obtained based on a picture group feature of a group of pictures to which the image frame belongs. The group of pictures is a combination of several image frames that are determined from the to-be-compressed video, and have high similarity and a small change. The picture group feature is used for describing the corresponding group of pictures, and specifically, may include a feature used for characterizing a hierarchical reference relationship between the image frames in the group of pictures. The result limit range is a range of the mapping result used for determining the parallel processing condition, and whether to perform parallel processing on the image frame is accurately determined by limiting a value range of the mapping result. In one embodiment, the result limit range may be between the lowest layer and the highest layer in the group of pictures to which the image frame belongs.

Specifically, when determining a parallel processing condition corresponding to the image frame according to a mapping result, the server acquires preset adaptive mapping parameter and result limit range. The adaptive mapping parameter is set according to an actual requirement, for example, may be set according to an application scenario, so that adaptive mapping of the image frame is adjusted as needed. The result limit range is obtained according to a picture group feature of a group of pictures to which the image frame belongs.

Step 304: Perform adaptive mapping on a differential feature of the image frame relative to a corresponding reference frame according to the adaptive mapping parameter to obtain a differential feature mapping result.

The differential feature mapping result is a preliminary mapping result obtained by performing adaptive mapping on the differential feature according to the adaptive mapping parameter. Specifically, after determining the adaptive mapping parameter, the server performs adaptive mapping on a differential feature of the image frame relative to a corresponding reference frame based on the adaptive mapping parameter to obtain a differential feature mapping result corresponding to the image frame.

Step 306: Adjust the differential feature mapping result based on the result limit range to obtain a mapping result within the result limit range.

After obtaining the differential feature mapping result, the server adjusts the differential feature mapping result based on the result limit range that is obtained according to the picture group feature of the group of pictures to which the image frame belongs, and specifically, may adjust a value of the differential feature mapping result, so that the differential feature mapping result is adjusted to the result limit range to obtain a mapping result within the result limit range. In a specific implementation, the server may compare the differential feature mapping result with the result limit range to determine whether the differential feature mapping result is within the result limit range. For example, in response to that the differential feature mapping result is numerical data, the result limit range is correspondingly a value range of the numerical data, and the server compares the differential feature mapping result with the result limit range. If the differential feature mapping result is within the result limit range, it is indicated that a value of the differential feature mapping result is within a reasonable range and does not need to be adjusted, and the server may directly determine a parallel processing condition corresponding to the image frame according to the differential feature mapping result. If the differential feature mapping result is outside the result limit range, the server needs to adjust the differential feature mapping result. When comparing the differential feature mapping result with end values of the result limit range, the server may determine whether the differential feature mapping result is greater than the upper limit end value of the result limit range or is not greater than the lower limit end value of the result limit range. In response to that the differential feature mapping result is greater than the upper limit end value of the result limit range, the differential feature mapping result may be adjusted to the upper limit end value of the result limit range to obtain a mapping result of the differential feature; and in response to that the differential feature mapping result is not greater than the lower limit end value of the result limit range, the differential feature mapping result may be adjusted to the lower limit end value of the result limit range to obtain a mapping result of the differential feature, and the obtained mapping result is within the result limit range.

Step 308: Determine a parallel processing threshold according to the mapping result, and generate a parallel processing condition corresponding to the image frame based on the parallel processing threshold.

The parallel processing threshold is a determination threshold in the parallel processing condition that is used for determining whether to perform parallel processing on the image frame, and is determined according to the mapping result. Specifically, in response to that the mapping result is numerical data, the mapping result may be directly taken as the parallel processing threshold, and the parallel processing condition corresponding to the image frame is generated based on the parallel processing threshold. For example, after the parallel processing threshold is determined according to the mapping result, the correspondingly generated parallel processing condition may be that, in response to that the hierarchical feature of the image frame is greater than the parallel processing threshold, it is determined that parallel processing needs to be performed on the image frame, and in response to that the hierarchical feature of the image frame is not greater than the parallel processing threshold, it is determined that the image frame is encoded by other processing methods instead of performing parallel processing on the image frame.

Specifically, after obtaining the mapping result corresponding to the differential feature, the server determines a parallel processing threshold based on the mapping result. Specifically, the server may set the parallel processing threshold with reference to the mapping result, and generate a parallel processing condition corresponding to the image frame based on the parallel processing threshold, for example, may take the parallel processing threshold as a determination condition for determining whether parallel processing needs to be performed on the image frame.

In this embodiment, adaptive mapping is performed on the differential feature of the image frame relative to the corresponding reference frame according to the preset adaptive mapping parameter, the differential feature mapping result of the adaptive mapping is adjusted according to the result limit range that is obtained according to the picture group feature of the group of pictures to which the image frame belongs to obtain the mapping result within the result limit range, and the parallel processing condition corresponding to the image frame is generated according to the parallel processing threshold determined based on the mapping result, so that the obtained parallel processing condition corresponds to the hierarchical feature and the differential feature of the image frame. Adaptive determination of whether to perform parallel processing on the image frame may be realized, and parallel compression analysis is adaptively performed, which may reduce an introduced compression performance loss, improve the video compression efficiency, and ensure the video compression performance.

In an embodiment, the differential feature includes a motion feature and a residual feature; the adaptive mapping parameter includes a motion feature mapping parameter and a residual feature mapping parameter; and the operation of performing adaptive mapping on a differential feature of the image frame relative to a corresponding reference frame according to the adaptive mapping parameters to obtain a differential feature mapping result includes the following steps: adaptive mapping is performed on the motion feature according to the motion feature mapping parameter to obtain a motion feature mapping result; adaptive mapping is performed on the residual feature according to the residual feature mapping parameter to obtain a residual feature mapping result; and a differential feature mapping result is obtained based on the motion feature mapping result and the residual feature mapping result.

The differential feature is used for characterizing a difference between the image frame and the corresponding reference frame, and specifically, may be obtained according to a picture change between the image frame and the corresponding reference frame, Specifically, the differential feature includes the motion feature and the residual feature. The motion feature is used for characterizing an image motion intensity of the image frame relative to the corresponding reference frame. The residual feature is used for characterizing the image similarity between the image frame and the corresponding reference frame. A change between the image frame and the reference frame may be reflected through the motion feature and the residual feature. The adaptive mapping parameter is a related parameter for performing adaptive mapping on the differential feature, and specifically, includes the motion feature mapping parameter and the residual feature mapping parameter. The motion feature mapping parameter is used for performing adaptive mapping on the motion feature, and the residual feature mapping parameter is used for performing adaptive mapping on the residual feature. The motion feature mapping parameter and the residual feature mapping parameter may be flexibly set according to an actual requirement, for example, may be set as constants for performing linear mapping on the motion feature and the residual feature.

Specifically, when performing adaptive mapping on the differential feature, the server performs adaptive mapping on the motion feature in the differential feature according to the motion feature mapping parameter in the adaptive mapping parameter to obtain a motion feature mapping result corresponding to the motion feature. The server performs adaptive mapping on the residual feature in the differential feature according to the residual feature mapping parameter in the adaptive mapping parameter to obtain a residual feature mapping result corresponding to the residual feature. After obtaining the motion feature mapping result and the residual feature mapping result, the server obtains a differential feature mapping result corresponding to the image frame based on the motion feature mapping result and the residual feature mapping result. In one embodiment, the server may fuse the motion feature mapping result with the residual feature mapping result, for example, may perform linear fusion or non-linear fusion, to obtain the differential feature mapping result.

In this embodiment, the differential feature includes the motion feature and the residual feature, adaptive mapping is performed on the motion feature and the residual feature, respectively, according to the adaptive mapping parameter, and the differential feature mapping result is obtained based on the obtained motion feature mapping result and residual feature mapping result. Adaptive mapping is performed on the differential feature of the image frame relative to the corresponding reference frame from multiple dimensions, so that the differential feature mapping result can accurately present an adaptive feature of the image frame, which facilitates the adaptive determination of whether to perform parallel processing on the image frame, and then parallel compression analysis is adaptively performed.

In an embodiment, the operation of performing, in response to that a hierarchical feature of the image frame satisfies the parallel processing condition, parallel compression analysis on image encoding units in the image frame to obtain an encoding parameter for the image frame includes the following steps: image encoding units in the image frame are determined in response to that an image depth of the image frame is greater than the parallel processing threshold; and parallel compression analysis is performed on the image encoding units by a wavefront parallel processing method, and an encoding parameter for the image frame is obtained according to analysis results respectively corresponding to the image encoding units.

The image depth refers to a layer where the image frame is located in a group of pictures to which the image frame belongs, which is determined according to a reference relationship between image frames in the group of pictures. Generally, the lower the image depth is, the smaller the quantity of reference frames corresponding to the image frame is. The image frame is referenced more frequently, which indicates that the image frame is more important, and higher compression performance needs to be protected. The higher the image depth is, the larger the quantity of reference frames corresponding to the image frame is. The image frame is referenced less frequently, which indicates that the image frame is less important, and parallel processing may be performed to improve the encoding compression efficiency. The parallel processing condition includes a condition for determining whether to perform parallel processing on the image frame based on the parallel processing threshold, and the parallel processing threshold is used for determining whether to perform parallel processing on the image frame. The image encoding units are obtained by performing unit division on the image frame and are processing units for performing parallel processing on the image frame. Parallel processing is performed on the image frame by simultaneously performing parallel processing on multiple independent image encoding units. The image encoding units correspondingly processed by the wavefront parallel processing method are coding tree units (CTUs), so that multiple rows of CTUs are processed simultaneously in the row of the CTU, and a succeeding row is 2 CTUs slower than a preceding row to ensure the original performance. Wavefront parallel processing refers to parallel processing used in a case where CTUs are dependent and need to refer to each other. For example, intra-frame prediction needs to refer to a CTU in a preceding row and the first left column, inter-frame prediction needs to refer to motion features of a preceding CTU and a left CTU, and loop filtering will cross CTUs and various boundaries. Parallel compression analysis is performed to obtain the analysis results respectively corresponding to the image encoding units, and the encoding parameter for the image frame is obtained based on the analysis results. The image frame is divided into multiple image encoding units, and analysis results respectively corresponding to the image encoding units may be synthesized to obtain an encoding parameter for the image frame.

Specifically, when performing parallel compression analysis on image encoding units in the image frame, the server determines an image depth of the image frame. Specifically, a corresponding group of pictures to which the image frame belongs may be determined, and the image depth of the image frame is determined based on the group of pictures. The image depth of the image frame may also be determined according to a hierarchical parameter carried by the image frame. The server compares the image depth of the image frame with the parallel processing threshold in the parallel processing condition. If the image depth of the image frame is greater than the parallel processing threshold, it is indicated that the image frame is in a higher layer and is less important, and parallel processing may be performed to improve the encoding compression efficiency. The server determines image encoding units in the image frame, and performs parallel compression analysis on the image encoding units by a wavefront parallel processing method to obtain analysis results respectively corresponding to the image encoding units. The analysis result may include an encoding parameter for the corresponding image encoding unit, and the encoding parameter for the image frame may be obtained according to the analysis results respectively corresponding to the image encoding units. Specifically, the analysis results respectively corresponding to the image encoding units are fused in order according to positions of the image encoding units in the image frame to obtain the encoding parameter for the image frame, and the image frame is encoded according to the encoding parameters for the image frame.

In this embodiment, in response to that the image depth of the image frame is greater than the parallel processing threshold, parallel compression analysis is performed on the image encoding units by the wavefront parallel processing method, and the encoding parameter for the image frame is obtained according to the analysis results respectively corresponding to the image encoding units. Parallel compression analysis is performed on image encoding units in a less important image frame by the wavefront parallel processing method, which may improve the encoding efficiency of the image frames in the video and ensure the video compression performance.

In an embodiment, the image encoding units in the image frame are arranged in rows; and the operation of performing parallel compression analysis on image encoding units, and obtaining an encoding parameter for the image frame according to analysis results respectively corresponding to the image encoding units includes the following steps: parallel residual analysis is performed on the image encoding units to obtain residual parameters respectively corresponding to the image encoding units; the residual parameter of the first image encoding unit is corrected in response to that the residual parameter of the first image encoding unit in the image encoding units satisfies a residual correction condition, the first image encoding unit being the first image encoding unit in each row of image encoding units; an analysis result corresponding to the first image encoding unit is obtained based on the corrected residual parameter; and an encoding parameter for the image frame is obtained according to the analysis results respectively corresponding to the image encoding units.

The image encoding units in the image frame are arranged in rows, that is, when parallel processing is performed on the image encoding units, the parallel processing is realized by simultaneously processing multiple rows of image encoding units. The parallel residual analysis refers to performing residual analysis on the image encoding units in the image frame in parallel. For example, residual analysis may be performed on 3 rows of image encoding units in parallel to determine residual parameters respectively corresponding to the image encoding units. The residual parameter reflects the similarity between the image encoding unit and an associated image encoding unit. The first image encoding unit is the first image encoding unit in each row of image encoding units, that is, during parallel processing, the first image encoding unit in each row of image encoding units is the first image encoding unit. The residual correction condition is used for determining whether the residual parameter of the first image encoding unit needs to be correct. The image encoding units in the image frame are arranged in rows, and parallel encoding analysis is performed by multiple rows. If a residual parameter of the first image encoding unit in a certain row is 0, a quantization parameter corresponding to the first image encoding unit is the last image encoding unit in a preceding row. During parallel processing, the first image encoding unit in this row and the last image encoding unit in the preceding row are processed in parallel, which will result in that the quantization parameter corresponding to the first image encoding unit in this row cannot be accurately determined and an image cannot be accurately reconstructed. Therefore, it is necessary to avoid the situation where the residual parameter of the first image encoding unit is 0. Specifically, the residual parameter is corrected, and an analysis result corresponding to the first image encoding unit is obtained based on the corrected residual parameter. The quantization parameter reflects the compression of spatial details. If the quantization parameter is small, most of the details in the video will be preserved; and as the quantization parameter increases, some details will be lost, the bit rate will be reduced, the image distortion is enhanced, and the quality is degraded.

Specifically, the image encoding units in the image frame are arranged in rows, and the server performs parallel compression analysis on the image encoding units by rows. Specifically, the server may perform parallel compression analysis on multiple rows of image encoding units in the image frame. Specifically, parallel residual analysis may be performed on the image encoding units to obtain residual parameters respectively corresponding to the image encoding units. In response to that the residual parameter of the first image encoding unit in the image encoding units satisfies the residual correction condition, it is indicated that the residual parameter of the first image encoding unit needs to be corrected to avoid the influence on encoding reduction of the first image encoding unit. In one embodiment, the server may determine whether the residual parameters of the first image encoding units take the value of 0, and correct a residual parameter of a first image encoding unit whose residual parameter takes the value of 0 to avoid the problem that the corresponding image frame cannot be accurately restored. In one embodiment, image information of the first image encoding unit may be adjusted. For example, a low frequency coefficient or high frequency coefficient corresponding to the first image encoding unit is modified from 0 to 1. The quantization parameter may be reduced, so that the residual parameter corresponding to the first image encoding unit is not 0. Encoding may be performed by a lossless encoding method, such as a pulse code modulation (PCM) encoding method, to avoid the situation where the residual parameter is 0.

After correcting the residual parameter of the first image encoding unit that satisfies the residual correction condition, the server performs parallel compression analysis based on the corrected residual parameter to obtain an analysis result corresponding to the first image encoding unit. However, parallel compression analysis may be directly performed on other image encoding units whose residual parameters do not need to be corrected in the video to obtain corresponding analysis results. After obtaining the analysis results respectively corresponding to the image encoding units, the server obtains an encoding parameter for the image frame based on the analysis results respectively corresponding to the image encoding units.

In this embodiment, when parallel compression analysis is performed on the image encoding units, for the first image encoding unit that satisfies the residual correction condition, a residual parameter of the first image encoding unit is corrected, an analysis result corresponding to the first image encoding unit is obtained based on the corrected residual parameter, and an encoding parameter for the image frame is obtained according to the analysis results respectively corresponding to the image encoding units in the image frame. The residual parameter of the first image encoding unit is corrected, so that the problem that the image frame cannot be restored and reconstructed is avoided, and the compression performance of the video is ensured.

In an embodiment, the operation of correcting the residual parameter of the first image encoding unit in response to that the residual parameter of the first image encoding unit in the image encoding units satisfies a residual correction condition includes the following steps: the residual parameter of the first image encoding unit is adjusted in response to that a numerical value of the residual parameter of the first image encoding unit in the image encoding units is zero, so that a numerical value of the adjusted residual parameter is not zero.

The image encoding units in the image frame are arranged in rows, and parallel encoding analysis is performed by multiple rows. If a residual parameter of the first image encoding unit in a certain row is 0, it is indicated that a quantization parameter corresponding to the first image encoding unit is the last image encoding unit in a preceding row. During parallel processing, the first image encoding unit in this row and the last image encoding unit in the preceding row are processed in parallel, which will result in that the quantization parameter corresponding to the first image encoding unit in this row cannot be accurately determined and an image cannot be accurately reconstructed. Therefore, it is necessary to avoid the situation where the residual parameter of the first image encoding unit is 0. Specifically, the residual parameter is corrected, and an analysis result corresponding to the first image encoding unit is obtained based on the corrected residual parameter.

Specifically, after obtaining the residual parameters of the first image encoding units, the server may adjust a residual parameter taking the value of 0. For example, a low frequency coefficient or high frequency coefficient corresponding to the first image encoding unit may be modified from 0 to 1. The quantization parameter may be reduced, so that the residual parameter corresponding to the first image encoding unit is not 0. Encoding may be performed by a lossless encoding method, such as a pulse code modulation (PCM) encoding method, to avoid the situation where the residual parameter takes the value of 0, that is, a numerical value of the adjusted residual parameter is not 0.

In this embodiment, a residual parameter of a first image encoding unit whose numerical value is 0 is adjusted, so that the problem that the image frame cannot be accurately restored and reconstructed is avoided, and the video compression performance is ensured.

In an embodiment, the operation of compressing the video based on the encoding parameters respectively corresponding to the image frames in the video includes the following steps: the encoding parameters respectively corresponding to the image frames in the video are determined; the corresponding image frames are encoded by a non-wavefront parallel processing method based on the encoding parameters respectively corresponding to the image frames to obtain encoding results respectively corresponding to the image frames; and the video is compressed based on the encoding results respectively corresponding to the image frames.

The non-wavefront parallel processing method refers to an encoding method without wavefront parallel processing, such as Slices and Tiles. The non-wavefront parallel processing method may be specifically set according to an actual requirement, and does not adopt wavefront parallel processing.

Specifically, when compressing the video, the server determines the encoding parameters respectively corresponding to the image frames in the video. For an image frame in the video that satisfies a corresponding parallel processing condition, parallel compression analysis may be performed on image encoding units in the image frame to obtain an encoding parameter for the image frame. However, for an image frame in the video that does not satisfy a corresponding parallel processing condition, compression analysis may be performed on the image frame by a method, such as Slices and Tiles, to obtain an encoding parameter corresponding to the image frame. That is, the encoding parameters respectively corresponding to the image frames in the video may include the encoding parameters obtained by performing parallel compression analysis on the image encoding units, and the encoding parameters obtained by performing compression analysis on the image frame that does not satisfy the parallel processing condition by other compression analysis methods. After obtaining the encoding parameters respectively corresponding to the image frames in the video, the server encodes the corresponding image frames by the non-wavefront parallel processing method, that is, an encoding method without wavefront parallel processing (WPP), based on the encoding parameters respectively corresponding to the image frames to obtain encoding results respectively corresponding to the image frames. For example, the image frames may be encoded by a method, such as Slices and Tiles, to obtain the encoding results respectively corresponding to the image frames. After obtaining the encoding results respectively corresponding to the image frames, the server may compress the video based on the encoding results respectively corresponding to the image frames. Specifically, the server may package the encoding results respectively corresponding to the image frames to compress the video so as to obtain a compression result corresponding to the video, and the compression result includes the encoding result respectively corresponding to the image frames in the video.

In one embodiment, for an image frame in the video that satisfies a corresponding parallel processing condition, parallel compression analysis is performed on image encoding units in the image frame. Specifically, parallel compression analysis may be performed on the image encoding units in the image frame by the wavefront parallel processing method to obtain an encoding parameter for the image frame. For an image frame in the video that does not satisfy a corresponding parallel processing condition, compression analysis may be performed on the image frame by other methods, such as Slices and Tiles, to obtain an encoding parameter corresponding to the image frame. However, when the image frames are encoded, the corresponding image frames may be encoded by the non-wavefront parallel processing method based on the encoding parameters respectively corresponding to the image frames, and the video is compressed based on the encoding results respectively corresponding to the image frames. Further, in response to that higher compression efficiency is required, when the image frames are encoded, the corresponding image frames may be encoded by the wavefront parallel processing method based on the encoding parameters respectively corresponding to the image frames, and the video is compressed based on the encoding results respectively corresponding to the image frames.

In this embodiment, the corresponding image frames are encoded by the non-wavefront parallel processing method based on the encoding parameters respectively corresponding to the image frames, which avoids the use of the wavefront parallel processing method in the encoding phase, may reduce a compression performance loss caused by encoding by the wavefront parallel processing method, and ensures the video compression performance.

In an embodiment, after the operation of acquiring a video to be compressed, the method further includes the following steps: image size information of each image frame in the video is determined; and the operation of performing adaptive mapping on each image frame in the video based on a differential feature of the image frame relative to a corresponding reference frame, and determining a parallel processing condition corresponding to the image frame according to a mapping result is performed in response to that the image size information and a compression resource satisfy a parallel initiation condition.

The image size information is used for describing an image size of each image frame in the video, and specifically, may include a width and a height of an image. Therefore, a resource required for compressing the video may be determined according to the image size information. The image size information may be determined by analyzing a size of each image frame in the video. The larger the image size of each image frame in the video is, the larger the data volume of each image frame is, and the more the divided parallel tasks are. The compression resource is a resource of a device configured to compress the video, and specifically, may be a computing resource of the server. The higher the compression resource of the server is, the more the parallel processing tasks may be supported. The parallel initiation condition is used for determining whether the server supports the initiation of parallel processing for the video, and specifically, may be set according to an actual resource state of the server.

Specifically, after obtaining the to-be-compressed video, the server determines image size information of each image frame in the video. Specifically, a preset quantity of image frames may be randomly extracted from the video, and a size of each image frame is analyzed to determine image size information of each image frame in the video, which specifically includes a width and a height of each image frame. The server further determines a compression resource that may be used for video compression. The server determines whether the parallel initiation condition is satisfied based on the image size information and the compression resource. For example, the server may determine a quantity of parallel compression tasks that can be supported based on the compression resource, determine a quantity of parallel compression tasks that may be divided according to the image size information, and synthetically determine whether the parallel initiation condition is satisfied. If the parallel initiation condition is satisfied, it is indicated that parallel compression may be performed on the video, and the operation of performing adaptive mapping on each image frame in the video based on a differential feature of the image frame relative to a corresponding reference frame, and determining a parallel processing condition corresponding to the image frame according to a mapping result is performed to compress the video. If the parallel initiation condition is not satisfied, it is indicated that the server does not support the processing for the video by the parallel compression method of this embodiment, and may compress the video by other compression methods, for example, may compress the video by a method such as Slices, Tiles, and frame-level parallelism.

In this embodiment, in response to that it is determined that the parallel initiation condition is satisfied according to the image size information of each image frame in the video and the compression resource of the server, parallel compression is performed on the video. Parallel compression analysis is adaptively performed for the image frames in the video, which reduces an introduced compression performance loss, improves the video compression efficiency, and ensures the video compression performance.

In an embodiment, the video compression method further includes the following step: the video is compressed by at least one parallel method of slice-level parallelism, tile-level parallelism, and frame-level parallelism in response to that the image size information and the compression resource do not satisfy the parallel initiation condition.

The image size information and the compression resource do not satisfy the parallel initiation condition, which indicates that the server does not support the processing for the video by the parallel compression method of this embodiment, and may compress the video by other compression methods. Slice-level parallelism refers to performing compression analysis on the image frame by Slices to obtain an encoding parameter corresponding to the image frame, and compressing the video based on the obtained encoding parameter. Tile-level parallelism refers to performing compression analysis on the image frame by Tiles to obtain an encoding parameter corresponding to the image frame, and compressing the video based on the obtained encoding parameter. Frame-level parallelism refers to performing parallel compression on independent non-reference frames in response to that frames refer to each other, so as to compress the video.

In this embodiment, in response to that it is determined that the parallel initiation condition is not satisfied according to the image size information and the compression resource, the video is compressed by at least one parallel method of slice-level parallelism, tile-level parallelism, and frame-level parallelism, so that various suitable compression methods can be adaptively selected according to the image size information and the compression resource to ensure the normal operation of video compression.

In an embodiment, the video compression method further includes the following step: a group of pictures to which the image frame belongs is determined from the video; a hierarchical feature of the image frame and a reference frame corresponding to the image frame are determined based on the group of pictures; and differential analysis is performed on the image frame and the reference frame to obtain a differential feature of the image frame relative to the reference frame.

The group of pictures refers to a frame sequence formed by dividing multiple image frames in the video. A completely encoded image frame may be set in the group of pictures and taken as a reference frame. Differences between other image frames in the group of pictures and the reference frame are encoded, that is, the reference frame is an image frame that is taken as a reference for encoding other image frames in the group of pictures. The hierarchical feature is used for characterizing hierarchical information of the image frame in the group of pictures to which the image frame belongs. The differential feature is used for characterizing a difference between the image frame and the corresponding reference frame, and specifically, may be obtained according to a picture change between the image frame and the corresponding reference frame. For example, the differential feature may be obtained according to an object difference or a pixel difference between the image frame and the corresponding reference frame.

Specifically, after obtaining the to-be-compressed video, when performing encoding for each image frame in the video, the server determines a group of pictures to which the image frame belongs from the video. Specifically, the group of pictures to which the image frame belongs may be determined according to a group division relationship between the image frames. After determining the group of pictures to which the image frame belongs, the server determines a hierarchical feature of the image frame and a reference frame corresponding to the image frame based on the group of pictures. The hierarchical feature may be obtained according to a layer corresponding to the image frame, and is used for describing a reference relationship of the image frame in the corresponding group of pictures to which the image frame belongs. Further, the server performs differential analysis on the image frame and the reference frame to obtain a differential feature of the image frame relative to the reference frame. Specifically, the server may perform image comparison on the image frame and the reference frame to determine the differential feature of the image frame relative to the reference frame. The differential feature may be used for characterizing a picture change of the image frame compared to the reference frame, and specifically, may include, but is not limited to, a motion feature, a residual feature, and the like. The server may perform adaptive mapping based on the differential feature of the image frame relative to the reference frame, and determine a parallel processing condition corresponding to the image frame according to a mapping result.

In this embodiment, the hierarchical feature of the image frame and the reference frame corresponding to the image frame are determined according to the group of pictures to which the image frame belongs, differential analysis is performed on the image frame and the corresponding reference frame to obtain the differential feature of the image frame relative to the reference frame, the parallel processing condition corresponding to the image frame is determined based on the differential feature, and parallel compression analysis is adaptively performed for the image frames in the video according to the parallel processing conditions.

In an embodiment, the operation of determining a hierarchical feature of the image frame and a reference frame corresponding to the image frame based on the group of pictures includes the following steps: a picture group feature of the group of pictures is determined; and a hierarchical feature of the image frame and a reference frame corresponding to the image frame are determined based on a picture group reference relationship in the picture group feature.

The picture group feature is used for describing the corresponding group of pictures, and specifically, may include a feature used for characterizing a hierarchical reference relationship between image frames in the group of pictures. The picture group feature includes a picture group attribute feature and a picture group reference relationship, the picture group attribute feature may be a feature used for describing a picture group attribute such as a size of the group of pictures and the serial number of an image frame, and the picture group reference relationship reflects a reference relationship between the image frames in the group of pictures.

Specifically, after determining the group of pictures to which the image frame belongs, the server acquires a picture group feature of the group of pictures. The picture group feature includes a picture group reference relationship. The server determines a hierarchical feature of the image frame and a reference frame corresponding to the image frame based on the picture group reference relationship in the picture group feature. In one embodiment, the server may determine a reference relationship between image frames in the group of pictures according to the picture group reference relationship, determine a hierarchical feature of the image frame in the group of pictures based on the reference relationship between the image frames, for example, may obtain the hierarchical feature of the image frame according to a layer where the image frame is located in the group of pictures, and determine a reference frame corresponding to the image frame according to the reference relationship between the image frames.

In this embodiment, the hierarchical feature of the image frame and the reference frame corresponding to the image frame are determined based on the picture group reference relationship in the picture group feature, the parallel processing condition corresponding to the image frame may be determined based on the differential feature of the image frame relative to the corresponding reference frame, and parallel compression analysis is adaptively performed for the image frames in the video according to the parallel processing conditions.

In an embodiment, the operation of performing differential analysis on the image frame and the reference frame to obtain a differential feature of the image frame relative to the reference frame includes the following steps: matching image blocks respectively corresponding to original image blocks in the image frame are determined from the reference frame; motion information respectively corresponding to the original image blocks is obtained according to positions of the original image blocks and positions of the corresponding matching image blocks; and a motion feature of the image frame relative to the reference frame is obtained based on the motion information respectively corresponding to the original image blocks.

The differential feature includes the motion feature. The motion feature is used for characterizing an image motion intensity of the image frame relative to the corresponding reference frame, and specifically, is determined according to motion information of the image frame relative to the corresponding reference frame. The image frame may be divided into multiple original image blocks, and a size of each original image block may be flexibly set according to an actual requirement. The image frame takes the reference frame as a reference, and the original image blocks in the image frame may be matched with corresponding matching image blocks in the reference frame. Motion information respectively corresponding to the original image blocks is obtained according to position changes between the original image blocks and the corresponding matching image blocks, that is, the motion information of the image frame relative to the reference frame is obtained, and a motion feature of the image frame relative to the reference frame may be obtained based on the motion information.

Specifically, when determining the differential feature of the image frame relative to the reference frame, the server determines matching image blocks respectively corresponding to original image blocks in the image frame from the reference frame. In a specific implementation, the server may divide the image frame into multiple original image blocks, and perform searching and matching in the reference frame for the original image blocks by a searching method, such as full search, diamond search, and quadrilateral search, to determine the matching image blocks respectively corresponding to the original image blocks from the reference frame. For example, a sum of absolute differences (SAD) or a sum of absolute transformed differences (SATD), that is, summation of absolute values after Hadamard transform, of pixel differences between the original image block and the image blocks in the reference frame may be calculated. An image block with a minimum calculation result is a matching image block corresponding to the original image block. After determining the matching image blocks in the reference frame, the server determines positions of the original image blocks and positions of the corresponding matching image blocks, and obtains motion information respectively corresponding to the original image blocks according to the positions of the original image blocks and the positions of the corresponding matching image blocks.

Specifically, displacements of the original image blocks relative to the corresponding matching image blocks may be determined according to the positions of the original image blocks and the positions of the corresponding matching image blocks to obtain the motion information respectively corresponding to the original image blocks. The server determines a motion feature of the image frame relative to the reference frame based on the motion information respectively corresponding to the original image blocks, and specifically, may perform summation transformation on the motion information respectively corresponding to the original image blocks to obtain the motion feature of the image frame relative to the reference frame. For example, a motion feature=(sum of displacements of all original image blocks in a current image frame in the X axis direction/an image width+sum of displacements of all original image blocks in the current image frame in the Y axis direction/an image height)/a quantity of all original image blocks/a distance between the current image frame and a reference frame. A larger numerical value of the motion feature represents a more intense image motion. On the contrary, a smaller numerical value of the motion feature represents a milder image motion.

In this embodiment, the motion information respectively corresponding to the original image blocks is determined according to the positions of the original image blocks in the image frame and the positions of the corresponding matching image blocks in the reference frame, the motion feature of the image frame relative to the reference frame is determined based on the motion information respectively corresponding to the original image blocks, the differential feature of the image frame relative to the reference frame may be determined according to an image displacement of the image frame relative to the reference frame, the parallel processing condition corresponding to the image frame is determined based on the differential feature, and parallel compression analysis is adaptively performed for the image frames in the video according to the parallel processing conditions.

In an embodiment, the motion information includes a first displacement of each original image block in the image frame in an image width direction, and a second displacement of each original image block in the image frame in an image height direction; and the operation of obtaining a motion feature of the image frame relative to the reference frame based on the motion information respectively corresponding to the original image blocks includes the following steps: summation is performed on the first displacements of the original image blocks, and a first displacement ratio is obtained based on a ratio of the obtained first displacement sum to an image width of the image frame; summation is performed on the second displacements of the original image blocks, and a second displacement ratio is obtained based on a ratio of the obtained second displacement sum to an image height of the image frame; an intermediate motion feature is obtained according to a ratio of a displacement ratio sum of the first displacement ratio and the second displacement ratio to a quantity of original image blocks; and a motion feature of the image frame relative to the reference frame is obtained according to a ratio of the intermediate motion feature to an image distance, the image distance including a distance between the reference frame and the image frame.

The first displacement is used for characterizing a position change of the original image block relative to the reference frame in the image width direction; and the second displacement is used for characterizing a position change of the original image block relative to the reference frame in the image height direction. The first displacement sum of the original image blocks in the image frame in the image width direction may be specifically obtained by performing summation on first displacements of original image blocks in a current image frame in an image width direction. The second displacement sum of the original image blocks in the image frame in the image height direction may be specifically obtained by performing summation on second displacements of the original image blocks in the current image frame in an image height direction.

Specifically, the server may perform summation on the first displacements of the original image blocks to obtain a first displacement sum, and determine a ratio of the first displacement sum to an image width of the image frame to obtain a first displacement ratio. The server may perform summation on the second displacements of the original image blocks to obtain a second displacement sum, and determine a ratio of the second displacement sum to an image height of the image frame to obtain a second displacement ratio. The server performs summation on the first displacement ratio and the second displacement ratio to obtain a displacement ratio sum, and determines a ratio of the displacement ratio sum to a quantity of original image blocks to obtain an intermediate motion feature. The server obtains an image distance according to a distance between the reference frame and the image frame, and obtains a motion feature of the image frame relative to the reference frame based on a ratio of the intermediate motion feature to the image distance. Specifically, for each image frame, a motion feature=(sum of displacements of all original image blocks in a current image frame in the X axis direction/an image width+sum of displacements of all original image blocks in the current image frame in the Y axis direction/an image height)/a quantity of all original image blocks/a distance between the current image frame and a reference frame. A larger numerical value of the motion feature represents a more intense image motion. On the contrary, a smaller numerical value of the motion feature represents a milder image motion.

In this embodiment, the motion feature is obtained according to the displacement sums of the original image blocks in the image frame in the image height direction and the image width direction, the original image blocks, and the distance between the reference frame and the image frame, which is used for accurately characterizing a motion change between the image frame and the reference frame, the parallel processing condition corresponding to the image frame is determined based on the motion feature, and parallel compression analysis is adaptively performed for the image frames in the video according to the parallel processing conditions.

In an embodiment, the operation of performing differential analysis on the image frame and the reference frame to obtain a differential feature of the image frame relative to the reference frame includes the following steps: matching image blocks respectively corresponding to original image blocks in the image frame are determined from the reference frame; residual information respectively corresponding to the original image blocks is obtained according to pixels in the original image blocks and pixels in the corresponding matching image blocks; and a residual feature of the image frame relative to the reference frame is obtained based on the residual information respectively corresponding to the original image blocks and a quantity of original image blocks.

The differential feature includes the residual feature. The residual feature is used for characterizing the image similarity between the image frame and the corresponding reference frame, and specifically, is determined according to the pixel similarity between the image frame and the corresponding reference frame. The image frame may be divided into multiple original image blocks, and a size of each original image block may be flexibly set according to an actual requirement. The image frame takes the reference frame as a reference, and the original image blocks in the image frame may be matched with corresponding matching image blocks in the reference frame. The residual information respectively corresponding to the original image blocks is obtained according to pixel changes between the original image blocks and the corresponding matching image blocks, that is, residual information of the image frame relative to the reference frame is obtained, and the residual feature of the image frame relative to the reference frame may be obtained based on the motion residual.

Specifically, when determining the differential feature of the image frame relative to the reference frame, the server determines matching image blocks respectively corresponding to original image blocks in the image frame from the reference frame. After determining the matching image blocks in the reference frame, the server determines pixels in the original image blocks and pixels in the corresponding matching image blocks, and obtains residual information respectively corresponding to the original image blocks according to the pixels in the original image blocks and the pixels in the corresponding matching image blocks. Specifically, pixel changes between the original image blocks and the corresponding matching image blocks may be determined according to the pixels in the original image blocks and the pixels in the corresponding matching image blocks to obtain residual information respectively corresponding to the original image blocks. The server determines a residual feature of the image frame relative to the reference frame based on the residual information respectively corresponding to the original image blocks, and specifically, may perform summation transformation on the residual information respectively corresponding to the original image blocks to obtain the residual feature of the image frame relative to the reference frame. For example, a residual feature=sum of absolute differences of residuals of all original image blocks in a current image frame/a quantity of all original image blocks. A larger numerical value of the residual feature represents lower image similarity. On the contrary, a smaller numerical value of the residual feature represents higher image similarity.

In this embodiment, the residual information respectively corresponding to the original image blocks is determined according to the pixels in the original image blocks in the image frames and the pixels in the corresponding matching image blocks in the reference frame, the residual feature of the image frame relative to the reference frame is determined based on the residual information respectively corresponding to the original image blocks, the differential feature of the image frame relative to the reference frame may be determined according to an image pixel change between the image frame and the reference frame, the parallel processing condition corresponding to the image frame is determined based on the differential feature, and parallel compression analysis is adaptively performed for the image frames in the video according to the parallel processing conditions.

In an embodiment, the residual information includes a pixel residual absolute value of the original image block, and the pixel residual absolute value of the original image block is obtained according to pixel differences between the pixels in the original image block and the corresponding matching image block; and the operation of obtaining a residual feature of the image frame relative to the reference frame based on the residual information respectively corresponding to the original image blocks and a quantity of original image blocks includes: summation is performed on the pixel residual absolute values of the original image blocks to obtain a sum of absolute differences of residuals; and a residual feature of the image frame relative to the reference frame is obtained according to a ratio of the sum of absolute differences of residuals and the quantity of original image blocks.

The pixel residual absolute value of the original image block is obtained by performing subtraction on pixel values of the original image block and the corresponding matching image block. Specifically, subtraction may be performed on the pixel values of the pixels in the original image block and the corresponding matching image block, an absolute value of the pixel difference is calculated, and summation is performed on the absolute values of the pixel differences of the pixels to obtain the pixel residual absolute value of the original image block. The sum of absolute differences of residuals is obtained by performing summation on the pixel residual absolute values of the original image blocks.

Specifically, the server performs summation on the pixel residual absolute values of the original image blocks to obtain a sum of absolute differences of residuals, determines a ratio of the sum of absolute differences of residuals to the quantity of original image blocks, and obtains a residual feature of the image frame relative to the reference frame according to the ratio of the sum of absolute differences of residuals to the quantity of original image blocks. In one embodiment, for each image frame, a residual feature=sum of absolute differences of residuals of all original image blocks in a current image frame/a quantity of all original image blocks. A larger numerical value of the residual feature represents lower image similarity. On the contrary, a smaller numerical value of the residual feature represents higher image similarity.

In this embodiment, the residual feature is determined according to the pixel residual absolute values obtained from the pixel differences between the pixels in the original image block and the corresponding matching image block, and the quantity of original image blocks, which is used for accurately characterizing a residual change between the image frame and the reference frame, the parallel processing condition corresponding to the image frame is determined based on the residual feature, and parallel compression analysis is adaptively performed for the image frames in the video according to the parallel processing conditions.

In an embodiment, the video compression method further includes the following step: compression analysis is performed on the image frame by a non-wavefront parallel processing method in response to that the hierarchical feature of the image frame does not satisfy the parallel processing condition to obtain an encoding parameter for the image frame.

The non-wavefront parallel processing method refers to a method without wavefront parallel processing, such as Slices and Tiles. The non-wavefront parallel processing method may be specifically set according to an actual requirement, and does not adopt wavefront parallel processing.

Specifically, in response to that the hierarchical feature of the image frame does not satisfy the parallel processing condition, it is indicated that the image frame is not suitable for performing parallel compression analysis on the image encoding units in the image frame, and the server performs compression analysis on the image frame by the non-wavefront parallel processing method, such as Slices and Tiles, to obtain an encoding parameter for the image frame. In one embodiment, for an image frame with a hierarchical feature that does not satisfy a parallel processing condition, the server may determine an encoding parameter for the image frame by other methods, for example, may perform compression analysis on image encoding units in the image frame in sequence to determine an encoding parameter for the current image frame, and perform encoding compression based on the encoding parameter.

In this embodiment, compression analysis is performed on the image frame that does not satisfy the parallel processing condition by the non-wavefront parallel processing method to determine the encoding parameter for the current image frame, and encoding compression is performed based on the encoding parameter. Parallel compression analysis may be adaptively performed for the image frames in the video, which reduces an introduced compression performance loss, improves the video compression efficiency, and ensures the video compression performance.

The present disclosure further provides an application scenario to which the foregoing video compression method is applied. Specifically, the application of the video compression method in the application scenario will be described below.

With the rapid development of video applications, videos are constantly developing in the direction of high-definition, high frame rate, and high resolution. H.265 is widely used due to its excellent compression performance, and plays an increasingly important role in the video field. H.265, also known as high efficiency video coding (HEVC), is a successor to the ITU-T H.264/MPEG-4 AVC standard. According to H.265, an image is divided into coding tree units (CTUs), a size of each coding tree unit may be set as 64×64 or limited 32×32 or 16×16 according to different encoding settings. A larger coding tree unit may provide higher compression efficiency (also require a higher encoding speed). Each coding tree unit may be recursively partitioned into 32×32, 16×16, or 8×8 sub-regions by using a quadtree structure. Each image is further divided into special groups of tree-coded blocks, which are called slices and tiles. A coding tree unit is a basic coding unit of H.265, just like a macroblock of H.264. A coding tree unit may be downwards partitioned into a coding unit (CU), a prediction unit (PU) and a transform unit (TU). Each coding tree unit contains 1 luma and 2 chroma coding tree blocks, as well as a syntax element for recording extra information. However, the computational complexity of H.265 is many times higher than that of H.264, and this high computational complexity is very expensive if it relies on the processing planning power of a single core only. Therefore, in an implementation of H.265, it is necessary to take into account parallel computing requirements and give full play to multi-core resources of a device.

From the perspective of data, parallel algorithms on H.265 are classified into group of pictures (GOP)-level, frame-level, slice/tile-level, and CTU-level WPP parallelism from high to low.

Figures 4, 5:
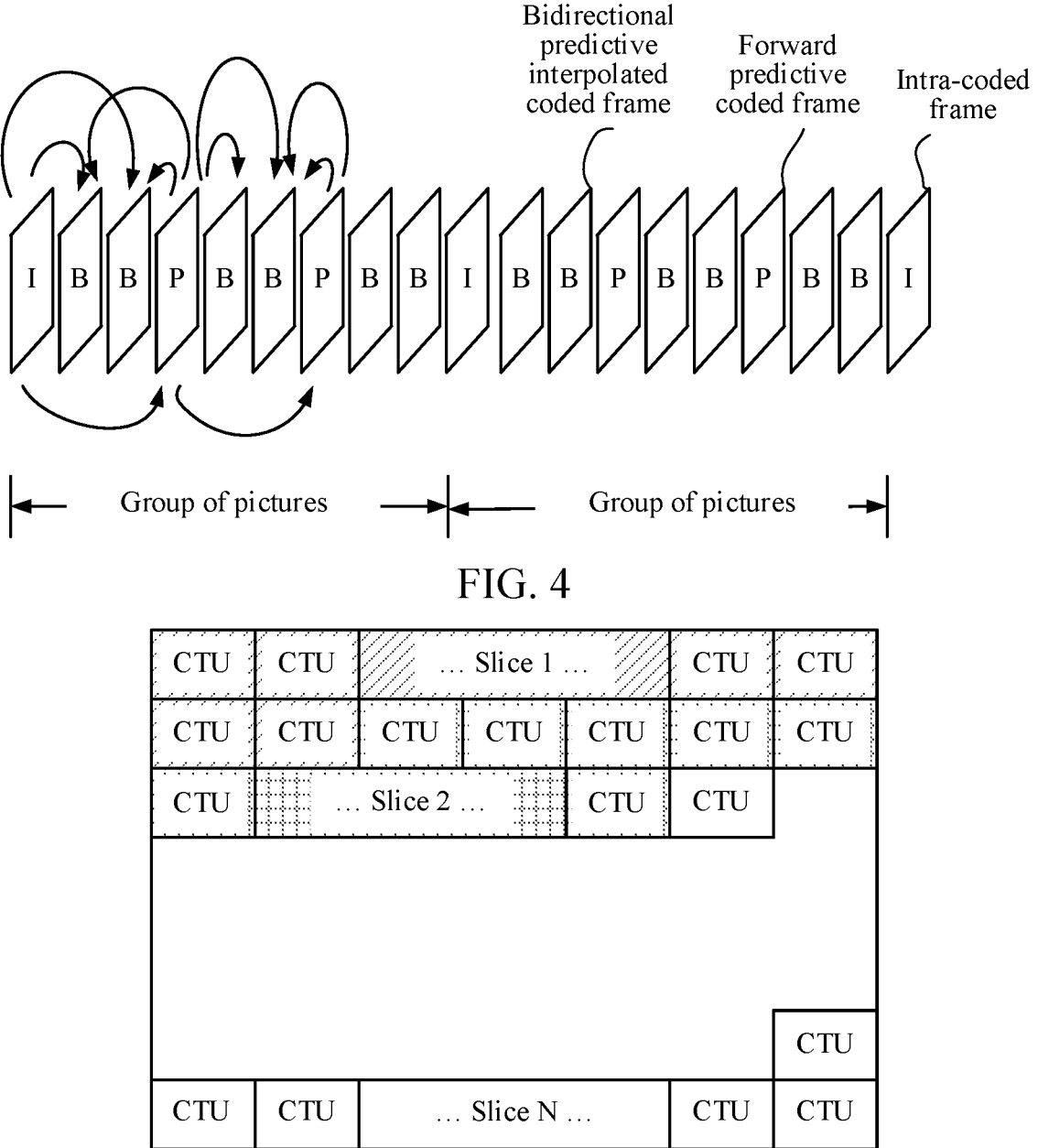
FIG. 4 is a schematic diagram of a group of pictures (GOP) according to an embodiment.
FIG. 5 is a schematic diagram of slice-level parallel processing.

With regard to GOP-level parallelism, GOP is the abbreviation of Group Of Pictures, which is a group of pictures. As shown in FIG. 4, in a GOP, an I frame is an intra-coded frame and represents a key frame, a picture of this frame is completely preserved, and only data of this frame is required during decoding. A P frame is a forward predictive coded frame and represents a difference between this frame and a preceding key frame (or a P frame), and during encoding, a previously-cached picture needs to be superimposed with the difference defined by this frame to generate a final picture. A P frame is a difference frame, does not have complete picture data, and only has data of a picture difference between this frame and a preceding frame. A B frame is a bidirectional predictive interpolated coded frame and records differences between this frame and preceding and succeeding frames. To decode the B frame, not only a previously-cached picture but also a decoded succeeding picture are acquired, a final picture is obtained by superimposing the preceding and succeeding pictures with data of this frame, and a compression rate of the B frame is high. A reference relationship among the I frame, the B frame, and the P frame is shown by arrows in FIG. 4, the P frames may be determined in sequence according to the I frame, and the B frames may be determined according to the I frame and the P frames. If it is defined that from an instantaneous decoding refresh (IDR) frame to a next IDR frame, GOPs are independent of each other and may be processed in parallel without introducing a compression performance loss, this parallelism has two problems. One is that sizes of the GOPs are not consistent and differences may be very large, which is not conducive to parallel efficiency. The other one is that when each GOP is added during parallel processing, a used memory is completely doubled, and the overhead is relatively large.

With regard to frame-level parallelism, a frame-level structure of H.265 is much more complicated than that of H.264, frames may refer to each other, but non-reference frames are independent of each other and may be processed in parallel. In addition, if the frames are layered according to a reference relationship, a relationship between frames in the same layer is weak, and in response to that the reference relationship is limited, the frames in the same layer may be processed in parallel at the expense of a certain compression performance.

With regard to slice-level parallelism, each frame of image may be split into multiple slices, and data of each slice is independent. As shown in FIG. 5, an image is divided into multiple slices, Slice 1 and Slice 2 are indicated by different filling lines, and the slices are independent of each other. Therefore, multiple slices in one frame may be processed in parallel. However, because the slices are independent of each other, intra-frame or inter-frame prediction cannot be performed on the slices across boundaries of the slices, and each slice has independent header information, resulting in reduced compression efficiency. As the number of slices increases, the degree of parallelism increases, but the compression efficiency decreases. In addition, cross-block filtering may be performed on the slices, but it will adversely affect the compression performance.

Figures 6, 7, 8:
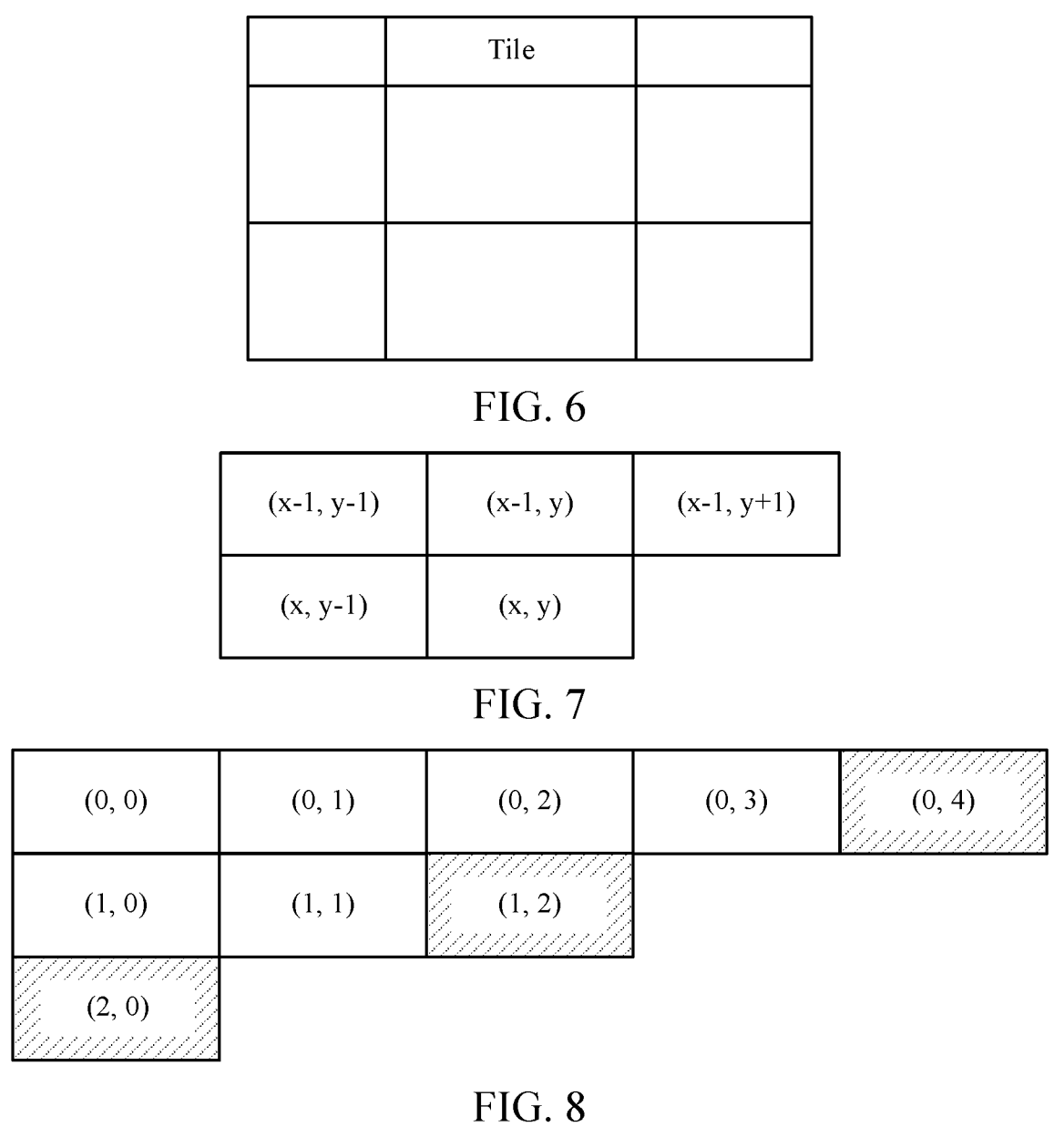

With regard to tile-level parallelism, the biggest change of tile-level parallelism compared to slice-level parallelism is that division does not need to be performed in a coder order of frames, and may be performed according to a rectangle. As shown in FIG. 6, an image is divided into rectangular tiles of various sizes. Furthermore, it is unnecessary to write header information, which reduces the waste of bit rate. However, meanwhile, tile-level parallelism and slice-level parallelism have the same problem, that is, the tiles are independent of each other, so intra-frame prediction cannot be performed across boundaries of the tiles, which reduces the compression rate. Meanwhile, tile-level parallelism and macroblock row-level parallelism are mutually exclusive, which also limits usage scenarios of tile-level parallelism.

With regard to CTU-level WPP parallelism, it is first proposed in H.265 and the most important parallel method in H.265. Its idea is that the prediction, reconstruction, entropy encoding, and the like of each block will use data of adjacent blocks, so each macroblock has an interdependence relationship with four blocks, that is, left, upper left, upper, and upper right blocks. As shown in FIG. 7, a CTU of (x, y) has an interdependence relationship with four CTUs, that is, left, upper left, upper, and upper right CTUs. Therefore, for different macroblock row, if two macroblocks can be staggered, the macroblocks may be processed in parallel. As shown in FIG. 8, parallel processing may be performed on shaded CTUs, which may greatly improve the parallel efficiency. However, this parallelism has certain disadvantages. Firstly, in order to enable each row to be encoded independently, entropy coding context model updating needs to be performed independently on each row during encoding, resulting in a compression performance loss. Moreover, an additional syntax element needs to be introduced, so that the compression performance is further lost. Secondly, for a layered coded frame-level structure, a frame with a higher hierarchical structure generates a larger compression performance loss. Finally, compression performance losses generated by frames of different features are different.

In some video compression technology, a unified parallel scheme is often adopted, which results in different effects on different video features and videos with different hierarchical structures, so it is not flexible. Furthermore, in order to bring greater parallel acceleration, a relatively large performance loss is introduced, and as the hierarchical structure becomes more complex, the performance loss increases. Further, in some video compression technology, although parallel encoding efficiency will be greatly improved, the compression performance loss is significant. The main reason is that a more appropriate scheme is not selected for different image feature, resulting in the compression performance loss. Parallel entropy encoding not only increases the speed to a certain extent, but also brings a large compression performance loss. When WPP parallelism is used for an image in a high layer, the parallel gain is limited, a relatively large compression performance loss is brought, and the loss is related to a feature of the image. Based on this, the general idea of the video compression method provided in this embodiment is to adaptively select an appropriate parallel scheme according to different video features. Specifically, frames in layers for which WPP needs to be turned on or turned off are adaptively calculated according to information of images. Furthermore, WPP parallel analysis is used during analysis, and an ordinary encoding method is adopted during encoding to reduce a compression performance loss generated during encoding.

Specifically, a to-be-compressed video is acquired, and whether to initiate WPP for parallel processing for the video is determined. Specifically, whether to initiate WPP is determined according to the number of CPU cores available to the server, and a width and a height of an image frame in the video. The more the available CPU cores are, the more resources may be provided for parallelism. The larger the width or height of the image, the more rows may be divided for WPP parallelism. During specific operation, whether to initiate WPP may be determined according to an actual situation. For example, in response to that cpu_number>2 and Min (Width/2/CTU_size, height/CTU_size)>2, WPP is turned on, which indicates that parallel compression needs to be performed on the video by WPP. cpu_number is the number of available CPU cores, Width is the width of the image frame in the video, Height is the height of the image frame in the video, and CTU_size is a size of a divided CTU, which may be, for example, 64*64. If it is determined that WPP is not turned on, the video is compressed by other video compression methods.

Figures 9, 10:
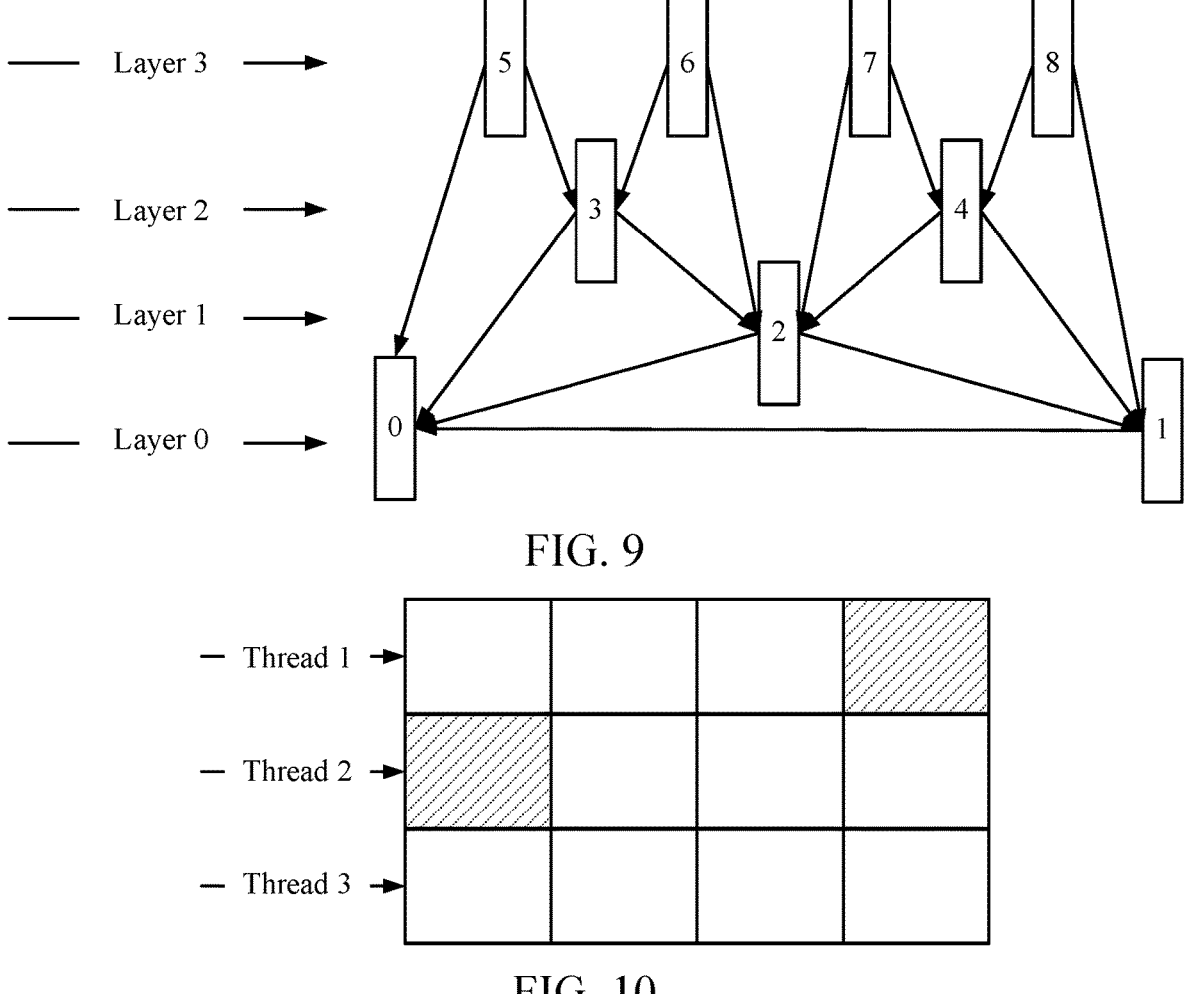
FIG. 9 is a schematic diagram of a reference relationship between image frames in a group of pictures (GOP) according to an embodiment.
FIG. 10 is a schematic diagram of correction of a residual parameter according to an embodiment.

Further, a hierarchical feature of an image frame in the video is determined, which specifically includes image hierarchical information. A GOP size and a reference relationship of the image are determined. The GOP size and the reference relationship may be determined according to parameters, or may be adaptively calculated according to an algorithm. The GOP size refers to a size of a group of pictures to which the image frame belongs, that is, a quantity of image frames in the group of pictures. The reference relationship is an interdependence relationship between the image frames in the group of pictures. As shown in FIG. 9, a group of pictures (GOP) includes a total of 8 image frames numbered 1 to 8, that is, a GOP size is 8. Sequence numbers represent a coder order of the image frames, an order from left to right is a display order of the images, and black arrows represent a reference relationship (dependency) between the frames, and a current frame depends on a pointed-to frame. For example, 2 refers to 0 and 1, and 4 refers to 2 and 1. The importance of the referenced frame is higher than that of the current frame, and the most important frame in a GOP is defined as layer 0 (i.e., depth of layer is 0), that is, the zeroth layer, and layer number (i.e., depth of layer) is increased by 1 for each lower level of importance. For example, in a GOP (with sequence numbers of 1 to 8), 1 is the most important frame, and its layer (or depth) is 0; 2 refers to 1, and its layer/depth is 1; 3 and 4 refer to 2, and their layer/depth is 2; and 5, 6, 7, and 8 refer to 3 and 4, and their layer/depth is 3. The smaller depth of layer is, the more important the image frame is, and the compression performance of the image frame needs to be ensured. On the contrary, the higher the depth of layer is, the less important the image frame is, and the compression efficiency of the image frame may be improved.

A motion feature of the image frame in the video, which specifically include motion intensity information. In the process of lookahead (pre-analysis), for each block with a size of 8×8 searching is performed in a reference image of the block to find a best matching block of the block from the reference image. A search method may be various search methods such as full search, diamond search, and quadrilateral search, and a matching method may be that a sum of absolute differences (SAD) or a sum of absolute transformed differences (SATD), that is, summation of absolute values after Hadamard transform, of pixel differences between the image of the original block and the image of the reference block is calculated. A block with a minimum calculation result is determined as a matching block corresponding to the original block. Displacement (x-offset, y-offset) of a current block relative to a matching block=(abs(x_original−x_matching), abs(y_original−y_matching)) (abs(x) represents evaluation of an absolute value of x), and a motion size of the current block is obtained. Motion intensity information of a current frame=(sum of x_offset of all blocks in the current frame/an image width+sum of y_offset of all blocks in the current frame/an image height)/a quantity of blocks in the current frame/a distance between an image and a reference image. The higher motion intensity represents a more intense image motion. On the contrary, the lower motion intensity represents a milder image motion.

A residual feature of the image frame in the video is determined, which specifically includes residual size information. After a matching block of an 8×8 block is obtained, a pixel difference between an image of the original block and an image of the matching block is calculated, that is, a residual. Residual information size=sum of SAD of residuals of all blocks in a current frame/a quantity of blocks in the current frame. The larger residual information size represents lower similarity between the images. On the contrary, the smaller residual information size represents higher similarity between the images.

Further, WPP may improve the parallel efficiency, but will reduce the compression performance. Therefore, different frames may be selected according to image information of the image frames in a video to adaptively determine whether WPP needs to be turned on. Different images are located in different layers in a GOP, which represent different degrees of importance. A frame in a lower layer is more important, is referenced more frequently, and has a larger range of influence. A frame in a higher layer is less important, is referenced less frequently, and has a smaller range of influence. Therefore, if WPP is turned on for an image in a lower layer, more performance losses will be caused, whereas if WPP is turned on for an image in a higher layer, a small performance loss will be caused. Based on this, a threshold may be set to reasonably select layers for which WPP is turned on. In response to that layer of a current image is less than or equal to the threshold, WPP is turn off. In response to that layer of the current image is greater than the threshold, WPP is turned on.

A threshold for WPP is a function related to motion intensity information my and residual size information res, Threshold=Fun(mv, res). Specifically, in response to that the motion intensity information is larger, an image motion is more intense, a correlation between images is lower, the impact caused by turning on of WPP is smaller; and in response to that the residual information size is larger, the similarity between images is lower, the impact caused by turning on of WPP is smaller. For example, Threshold=Clip (0, maxLayer, a/mv+b/res), where, a and b coefficients may be set according to an actual situation, and MaxLayer is the maximum layer in a current GOP. y=Clip(min, max, x) represents that x is limited in a range of the minimum value min to the maximum value max, and a return value is assigned to y, that is, in response to that a value of x is between min and max, y=x. If x is less than min, y=min, and if x is greater than max, y=max. In addition, in addition to determining whether WPP is initiated or not according to a layer where an image frame is located, the determination may be performed according to a referenced parameter of the image frame. The larger the number of times the image frame is referenced, the lower the layer where the image frame is located is, and the compression performance of the image frame needs to be ensured.

If it is determined that WPP needs to be initiated for parallel compression for the image frame in the video, a specific usage mode of WPP is further determined. A compression process of a video mainly includes two phases: an analysis phase and an encoding phase. The analysis phase refers to a process of selecting various encoding parameters such as an optimal divided block size of each CTU (64×64, 32×32 or 16×16), a division mode (including an intra-frame mode such as a DC mode, a planer mode, and an angle mode, and an inter-frame mode such as a one-way inter-frame mode and a two-way frame mode), and residual transform quantized coefficients. The encoding phase refers to a process of writing various encoding parameters, such as an optimal divided block size, a division mode, and a residual coefficient, into a code stream. Dual WPP refers to a method of using WPP in both the analysis phase and the encoding phase. In this embodiment, WPP is used for parallel analysis acceleration in the analysis phase, while WPP parallel encoding is not used in the encoding phase. A difference between the two lies in that the dual WPP method causes a significant compression performance loss while greatly increasing the speed, while in this embodiment, by removing WPP parallelism in the encoding phase, the loss may be greatly reduced to ensure the video compression performance. In one embodiment, if WPP is required for parallel processing for a current image frame, WPP is used for parallel analysis acceleration by default in the analysis phase, and WPP parallel encoding is not used in the encoding phase. If a higher encoding speed is required, the dual WPP method may be selected, that is, WPP parallel encoding is also used in the encoding phase.

In addition, in response to that WPP is used in the analysis phase and WPP is not used in the encoding phase, if a coding block flag (cbf, used for characterizing a residual) of the first TU block of a certain CTU block in a current macroblock row is 0, a quantization parameter qp of the TU block is equal to last_qp, that is, a quantization parameter qp of the last block in the preceding row. As shown in FIG. 10, in response to that a cbf of the first TU block in thread 2 is 0, it is indicated that a quantization parameter qp of the TU block is a quantization parameter qp of the last block in the preceding row, that is, is equal to a quantization parameter qp of the last shaded block in thread 1. As a result of parallel analysis, an accurate quantization parameter qp of a current block cannot be obtained, so that an image cannot be accurately reconstructed. Based on this, it is necessary to avoid the situation where a cbf of the first block in a current row is equal to 0, that is, there is no residual. Specifically, after a current block is transformed and quantized, if it is found that a residual of the current block is 0, a transformed low frequency coefficient of the current block may be changed from 0 to 1 to avoid the situation where cbf=0. In addition, high frequency information may be changed from 0 to 1, or a qp value is reduced until the residual of the image is not 0, or PCM lossless encoding is used to avoid the situation where the residual is 0, so as to ensure the video compression performance.

A specific application test is shown in Table 1.

TABLE 1

| Video type | BD - peak signal to noise ratio | BD - structural similarity | Boost |
|---|---|---|---|
| Class B | −0.94% | −0.98% | −2.63% |
| Class C | −1.04% | −1.02% | −10.55% |
| Class D | −1.03% | −1.29% | −15.09% |
| Class E | −1.45% | −1.55% | −2.99% |
| Class F | −1.13% | −1.16% | −1.68% |
| LOWRES | −1.15% | −1.37% | −4.87% |
| 720 p short video | −0.61% | −0.99% | −4.47% |
| 540 p short video | −1.09% | −1.47% | −3.11% |
| Film | −0.60% | −0.80% | −2.42% |
| Game | −0.66% | −0.85% | −8.37% |
| Talk show | −0.83% | −0.86% | −4.13% |
| Music video (MV) | −0.94% | −0.92% | −2.89% |
| Sport video | −0.79% | −0.84% | −2.66% |
| MSU video | −0.71% | −0.96% | −4.57% |
| 4 K high-definition video | −0.63% | −0.71% | −0.19% |
| Average | −0.79% | −0.95% | −3.92% |

Class B, class C, class D, class E and class F are standard test sequence groups for testing compression performance, and the others are different types of video test sequence groups. Peak signal to noise ratio (PSNR): the greater the PSNR of two images is, the more similar the two images are. Structural similarity index measure (SSIM): a calculation result of SSIM is a decimal between −1 and 1, and if the result is 1, it is indicated that data of two compared images is consistent. In response to that the BD-rate is a negative value, it is indicated that the bit rate is reduced and the performance is improved under the same PSNR condition; and in response to that the BD-rate is a positive value, it is indicated that the bit rate is increased and the performance is reduced. As shown in Table 1, the video compression method provided in this embodiment improves the compression performance by 0.79% to 0.95% compared with the existing parallel scheme with the highest performance, and the compression performance is improved significantly.

In this embodiment, an appropriate parallel scheme is adaptively selected for different video features including hierarchical information, motion information, and a residual of the video. Specifically, for a frame in a bottom layer, WPP parallel analysis may be adaptively used in the analysis phase, and an ordinary encoding method or WPP encoding may be used in the encoding phase to improve the video parallelism and minimize a compression performance loss, so as to improve the video parallel compression efficiency and ensure the video compression performance.

It is to be understood that, although the steps in the flowcharts in FIG. 2 and FIG. 3 are displayed sequentially as indicated by the arrows, these steps are not necessarily performed sequentially in the order indicated by the arrows. Unless otherwise explicitly specified herein, there is no strict restriction on the order in which these steps are performed, and these steps may be performed in other orders. Furthermore, at least some steps in FIG. 2 and FIG. 3 may include multiple sub-steps or multiple phases. These sub-steps or phases are not necessarily performed at the same moment, and may be performed at different moments. These sub-steps or phases are not necessarily performed in order, and may be performed in turn or alternately with other steps or at least some sub-steps or phases of other steps.

Figure 11:
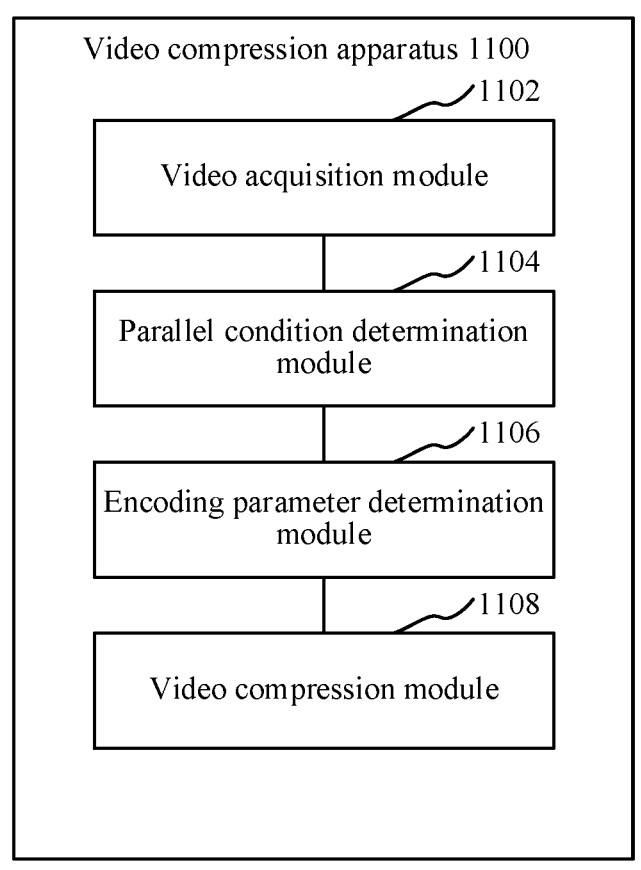
FIG. 11 is a structural block diagram of a video compression apparatus according to an embodiment.

In an embodiment, as shown in FIG. 11, a video compression apparatus 1100 is provided, which may adopt a software module, a hardware module, or a combination of the two to form a part of a computer device. The apparatus specifically includes: a video acquisition module 1102, a parallel condition determination module 1104, an encoding parameter determination module 1106, and a video compression module 1108.

The video acquisition module 1102 is configured to acquire a video to be compressed.

The parallel condition determination module 1104 is configured to perform adaptive mapping on each image frame in the video based on a differential feature of the image frame relative to a corresponding reference frame, and determine a parallel processing condition corresponding to the image frame according to a mapping result.

The encoding parameter determination module 1106 is configured to perform, in response to that a hierarchical feature of the image frame satisfies the parallel processing condition, parallel compression analysis on image encoding units in the image frame to obtain an encoding parameter for the image frame, the image encoding units being obtained by performing unit division on the image frame.

The video compression module 1108 is configured to compress the video based on the encoding parameters respectively corresponding to the image frames in the video.

In an embodiment, the parallel condition determination module 1104 includes a mapping parameter determination module, an adaptive mapping module, a mapping adjustment module, and a parallel condition generation module. The mapping parameter determination module is configured to determine an adaptive mapping parameter and a result limit range, the result limit range being obtained based on a picture group feature of a group of pictures to which the image frame belongs. The adaptive mapping module is configured to perform adaptive mapping on the differential feature of the image frame relative to the corresponding reference frame according to the adaptive mapping parameter to obtain a differential feature mapping result. The mapping adjustment module is configured to adjust the differential feature mapping result based on the result limit range to obtain a mapping result within the result limit range. The parallel condition generation module is configured to determine a parallel processing threshold according to the mapping result, and generate a parallel processing condition corresponding to the image frame based on the parallel processing threshold.

In an embodiment, the differential feature includes a motion feature and a residual feature; the adaptive mapping parameter includes a motion feature mapping parameter and a residual feature mapping parameter; and the adaptive mapping module includes a motion feature mapping module, a residual feature mapping module, and a mapping result fusion module. The motion feature mapping module is configured to perform adaptive mapping on the motion feature according to the motion feature mapping parameter to obtain a motion feature mapping result. The residual feature mapping module is configured to perform adaptive mapping on the residual feature according to the residual feature mapping parameter to obtain a residual feature mapping result. The mapping result fusion module is configured to obtain a differential feature mapping result based on the motion feature mapping result and the motion feature mapping result.

In an embodiment, the encoding parameter determination module 1106 includes an encoding unit determination module and a wavefront parallel processing module. The encoding unit determination module is configured to determine image encoding units in the image frame in response to that an image depth of the image frame is greater than the parallel processing threshold. The wavefront parallel processing module is configured to perform parallel compression analysis on the image encoding units by a wavefront parallel processing method, and obtain an encoding parameter for the image frame according to analysis results respectively corresponding to the image encoding units.

In an embodiment, the image encoding units in the image frame are arranged in rows; and the encoding parameter determination module 1106 further includes a residual analysis module, a residual parameter correction module, an analysis result obtaining module, and an analysis result processing module. The residual analysis module is configured to perform parallel residual analysis on the image encoding units to obtain residual parameters respectively corresponding to the image encoding units. The residual parameter correction module is configured to correct a residual parameter of the first image encoding unit in response to that the residual parameter of the first image encoding unit in the image encoding units satisfies a residual correction condition, the first image encoding unit being the first image encoding unit in each row of image encoding units. The analysis result obtaining module is configured to obtain an analysis result corresponding to the first image encoding unit based on the corrected residual parameter. The analysis result processing module is configured to obtain an encoding parameter for the image frame according to the analysis results respectively corresponding to the image encoding units.

In an embodiment, the video compression module 1108 includes an encoding parameter acquisition module, an encoding module, and an encoding result processing module. The encoding parameter acquisition module is configured to determine encoding parameters respectively corresponding to the image frames in the video. The encoding module is configured to encode the corresponding image frames based on the encoding parameters respectively corresponding to the image frames by a non-wavefront parallel processing method to obtain encoding results respectively corresponding to the image frames. The encoding result processing module is configured to compress the video based on the encoding results respectively corresponding to the image frames.

In an embodiment, the video compression apparatus further includes an image size determination module configured to determine image size information of each image frame in the video; and perform, in response to that the image size information and a compression resource satisfy a parallel initiation condition, the step of performing adaptive mapping on each image frame in the video based on a differential feature of the image frame relative to a corresponding reference frame, and determining a parallel processing condition corresponding to the image frame according to a mapping result.

In an embodiment, the video compression apparatus further includes a picture group determination module, a picture group analysis module, and a differential analysis module. The picture group determination module is configured to determine a group of pictures to which the image frame belongs from the video. The picture group analysis module is configured to determine a hierarchical feature of the image frame and a reference frame corresponding to the image frame based on the group of pictures. The differential analysis module is configured to perform differential analysis on the image frame and the reference frame to obtain a differential feature of the image frame relative to the reference frame.

In an embodiment, the picture group analysis module includes a picture group feature determination module and a picture group feature analysis module. The picture group feature determination module is configured to determine a picture group feature of the group of pictures. The picture group feature analysis module is configured to determine a hierarchical feature of the image frame and a reference frame corresponding to the image frame based on a picture group reference relationship in the picture group feature.

In an embodiment, the differential analysis module includes a matching image block determination module, a motion information determination module, and a motion feature determination module. The matching image block determination module is configured to determine matching image blocks respectively corresponding to original image blocks in the image frame from the reference frame. The motion information determination module is configured to obtain motion information respectively corresponding to the original image blocks according to positions of the original image blocks and positions of the corresponding matching image blocks. The motion feature determination module is configured to obtain a motion feature of the image frame relative to the reference frame based on the motion information respectively corresponding to the original image blocks.

In an embodiment, the differential analysis module further includes a matching image block determination module, a residual information determination module, and a residual feature determination module. The matching image block determination module is configured to determine matching image blocks respectively corresponding to original image blocks in the image frame from the reference frame. The residual information determination module is configured to obtain residual information respectively corresponding to the original image blocks according to pixels of the original image blocks and pixels of the corresponding matching image blocks. The residual feature determination module is configured to obtain a residual feature of the image frame relative to the reference frame based on the residual information respectively corresponding to the original image blocks and a quantity of original image blocks.

In an embodiment, the video compression apparatus further includes a non-wavefront parallel processing module configured to perform, in response to that the hierarchical feature of the image frame does not satisfy the parallel processing condition, compression analysis on the image frame by a non-wavefront parallel processing method to obtain an encoding parameter for the image frame.

The specific definition of the video compression apparatus may refer to the definition of the foregoing video compression method, which is not described in detail here. All or some of the modules in the foregoing video compression apparatus may be implemented by software, hardware, or a combination of the software and the hardware. The foregoing modules may be embedded in or independent of a processor in a computer device in the form of hardware, or may be stored in a memory of the computer device in the form of software, so that the processor may invoke and execute the operations corresponding to the foregoing modules.

Figure 12:
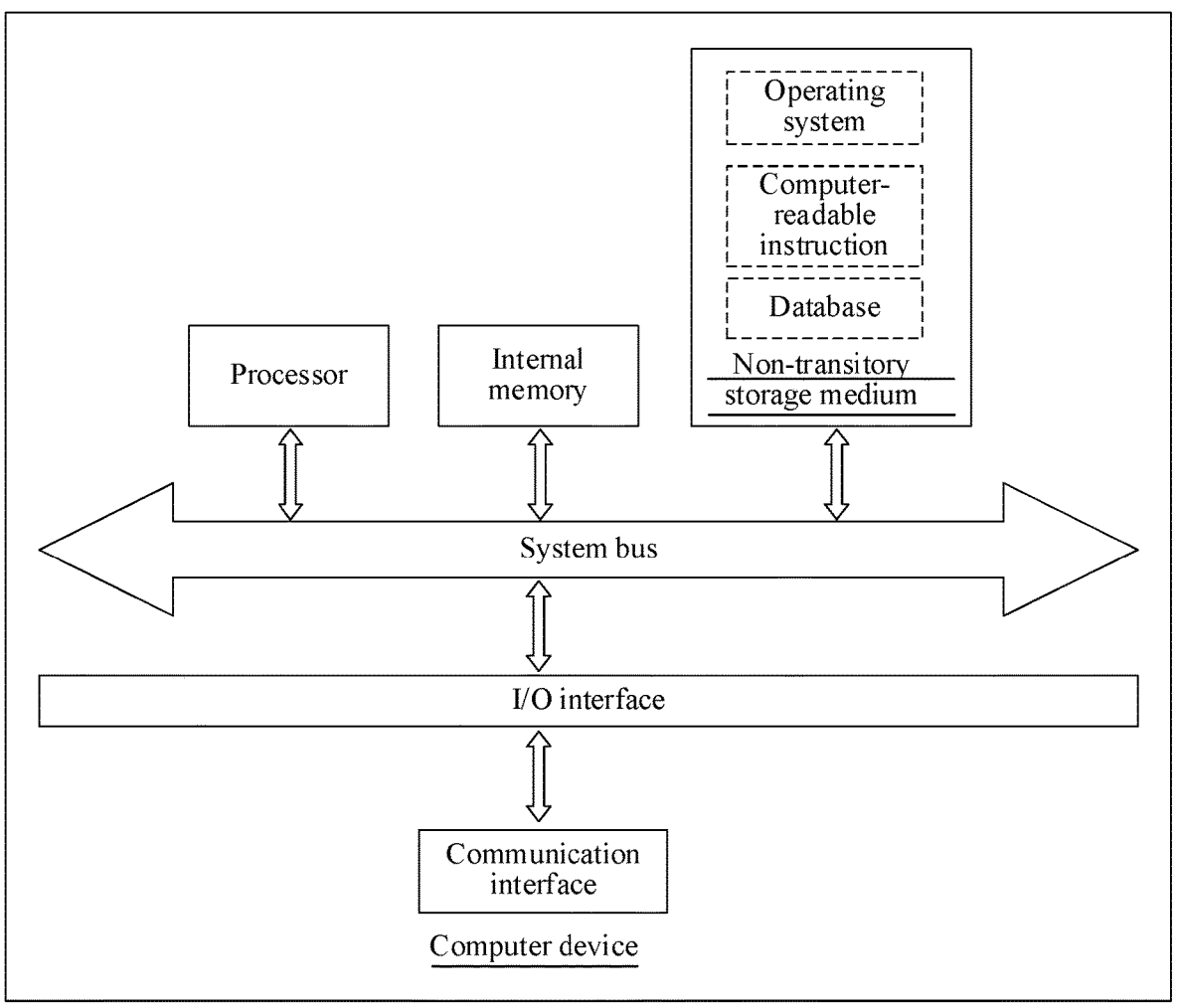
FIG. 12 is a diagram of an internal structure of a computer device according to an embodiment.

In an embodiment, a computer device is provided, which may be a server. An internal structure of the computer device may be as shown in FIG. 12. The computer device includes a processor, a memory, and a network interface that are connected via a system bus. The processor of the computer device is configured to provide computing and control power. The memory of the computer device includes a non-transitory storage medium and an internal memory. The non-transitory storage medium stores an operating system, a computer-readable instruction, and a database. The internal memory provides an environment for the operation of the operating system and computer-readable instructions in the non-volatile storage medium. The database of the computer device is used for storing adaptive mapping data. The network interface of the computer device is configured to connect to and communicate with an external terminal via a network. The computer-readable instruction is executed by the processor to implement a video compression method.

Those skilled in the art may understand that the structure shown in FIG. 12 is merely a block diagram of a partial structure related to the solution of the present disclosure, and does not constitute a limitation to the computer device to which the solution of the present disclosure is applied. Specifically, the computer device may include more components or fewer components than those shown in the figure, or some components may be combined, or a different component deployment may be used.

In an embodiment, a computer device is further provided, which includes a memory and a processor. The memory stores a computer-readable instruction that, when executed by the processor, implements the steps in the foregoing method embodiments.

In an embodiment, a computer-readable storage medium is provided, which stores a computer-readable instruction that, when executed by a processor, implements the steps in the foregoing method embodiments.

In an embodiment, a computer program product is provided, which includes a computer-readable instruction. The computer-readable instruction is stored in a computer-readable storage medium. A processor of a computer device reads the computer-readable instruction from the computer-readable storage medium and executes the computer-readable instruction to cause the computer device to perform the steps in the foregoing method embodiments.

User information (including but not limited to user device information user personal information, and the like) and data (including but not limited to data used for analysis, stored data, displayed data, and the like) involved in the present disclosure are information and data authorized by users or fully authorized by all parties, and the collection, use, and processing of relevant data shall comply with relevant laws and regulations and standards of relevant countries and regions.

Those of ordinary skill in the art may understand that all or some of the processes in the method in the foregoing embodiments may be implemented by a computer-readable instruction by instructing relevant hardware. The computer-readable instruction may be stored in a non-volatile computer-readable storage medium. When the computer-readable instruction is executed, the processes in the method in the foregoing embodiments may be implemented. Any reference to the memory, the database, or other media used in the embodiments of the present disclosure may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magneto-resistive random access memory (MRAM), a ferroelectric random access memory (FRAM), a phase change memory (PCM), a graphene memory, and the like. The volatile memory may include a random access memory (RAM), an external cache memory, and the like. As an illustration and not a limitation, the RAM may be in a variety of forms such as a static random access memory (SRAM) and a dynamic random access memory (DRAM). The databases involved in the embodiments of the present disclosure may include at least one of a relational database and a non-relational database. The non-relational database may include, but is not limited to, a blockchain-based distributed database and the like. The processor involved in the embodiments of the present disclosure may be, but is not limited to, a general-purpose processor, a central processing unit, a graphics processing unit, a digital signal processor, a programmable logic device, a quantum computing-based data processing logic device, and the like.

The technical features of the foregoing embodiments may be combined in different manners to form other embodiments. To make description concise, not all possible combinations of the technical features of the foregoing embodiments are described. However, the combinations of these technical features shall be considered as falling within the scope recorded by this specification provided that no conflict exists. The foregoing embodiments are only several implementation modes of the present disclosure, which are described specifically and in detail, but cannot be construed as a limitation to the scope of the patent of the present disclosure. It is to be pointed out that those of ordinary skill in the art may make several transformations and improvements without departing from the idea of the present disclosure, and these transformations and improvements shall belong to the scope of protection of the present disclosure.

Therefore, the scope of protection of the patent of the present disclosure shall be subject to the appended claims.

What is claimed is:

1. A video compression method, performed by a computer device and comprising:

acquiring a video to be compressed;

determining encoding parameters respectively corresponding to a plurality of image frames in the video, comprising: for an image frame of a plurality of image frames:

determining an adaptive mapping parameter and a result limit range, the result limit range being obtained based on a picture group feature of a group of pictures to which the image frame belongs;

performing adaptive mapping on the image frame based on a differential feature of the image frame relative to a corresponding reference frame according to the adaptive mapping parameter, to obtain a differential feature mapping result;

adjusting the differential feature mapping result based on the result limit range to obtain a mapping result within the result limit range;

determining a parallel processing condition corresponding to the image frame according to the mapping result; and performing, in response to that a hierarchical feature of the image frame satisfies the parallel processing condition, parallel compression analysis on image encoding units in the image frame to obtain an encoding parameter for the image frame, the image encoding units being obtained by performing unit division on the image frame; and compressing the video based on the encoding parameters respectively corresponding to the plurality of image frames in the video.

2. The method according to claim 1, wherein determining the parallel processing condition corresponding to the image frame according to the mapping result comprises:

determining a parallel processing threshold according to the mapping result, and generating the parallel processing condition corresponding to the image frame based on the parallel processing threshold.

3. The method according to claim 1, wherein the differential feature comprises a motion feature and a residual feature; the adaptive mapping parameter comprises a motion feature mapping parameter and a residual feature mapping parameter; and the performing adaptive mapping on the differential feature of the image frame relative to the corresponding reference frame according to the adaptive mapping parameter to obtain a differential feature mapping result comprises:

performing adaptive mapping on the motion feature according to the motion feature mapping parameter to obtain a motion feature mapping result;

performing adaptive mapping on the residual feature according to the residual feature mapping parameter to obtain a residual feature mapping result; and obtaining the differential feature mapping result based on the motion feature mapping result and the residual feature mapping result.

4. The method according to claim 1, wherein the performing, in response to that a hierarchical feature of the image frame satisfies the parallel processing condition, parallel compression analysis on image encoding units in the image frame to obtain an encoding parameter for the image frame comprises:

determining image encoding units in the image frame in response to that an image depth of the image frame is greater than a parallel processing threshold; and performing parallel compression analysis on the image encoding units by a wavefront parallel processing method, and obtaining an encoding parameter for the image frame according to analysis results respectively corresponding to the image encoding units.

5. The method according to claim 4, wherein the image encoding units in the image frame are arranged in rows; and the performing parallel compression analysis on the image encoding units, and obtaining an encoding parameter for the image frame according to analysis results respectively corresponding to the image encoding units comprises:

performing parallel residual analysis on the image encoding units to obtain residual parameters respectively corresponding to the image encoding units;

correcting a residual parameter of a first image encoding unit in response to that a residual parameter of the first image encoding unit in the image encoding units satisfies a residual correction condition, to obtain a corrected residual parameter, the first image encoding unit being a first image encoding unit in one row of the image encoding units;

obtaining an analysis result corresponding to the first image encoding unit based on the corrected residual parameter; and obtaining an encoding parameter for the image frame according to analysis results respectively corresponding to the image encoding units.

6. The method according to claim 5, wherein the correcting a residual parameter of the first image encoding unit in response to that the residual parameter of the first image encoding unit in the image encoding units satisfies a residual correction condition comprises:

adjusting the residual parameter of the first image encoding unit to have a non-zero numerical value in response to that a numerical value of the residual parameter of the first image encoding unit in the image encoding units is zero.

7. The method according to claim 1, wherein the compressing the video based on the encoding parameters respectively corresponding to the image frames in the video comprises:

compressing the corresponding image frames by a non-wavefront parallel processing method based on the encoding parameters respectively corresponding to the plurality of image frames, to obtain encoding results respectively corresponding to the plurality of image frames; and compressing the video based on the encoding results respectively corresponding to the plurality of image frames.

8. The method according to claim 1, further comprising: for an image frame of a plurality of image frames:

determining image size information of the image frame; and performing, in response to that the image size information and a compression resource satisfy a parallel initiation condition, the operation of performing adaptive mapping on the image frame in the video based on a differential feature of the image frame relative to a corresponding reference frame.

9. The method according to claim 8, further comprising:

compressing the video by a parallel method in response to that the image size information and the compression resource do not satisfy the parallel initiation condition, the parallel method comprising at least one of: slice-level parallelism, tile-level parallelism, or frame-level parallelism.

10. The method according to claim 1, further comprising:

determining a group of pictures to which the image frame belongs in the video;

determining a hierarchical feature of the image frame and a reference frame corresponding to the image frame based on the group of pictures; and performing differential analysis on the image frame and the reference frame to obtain a differential feature of the image frame relative to the reference frame.

11. The method according to claim 10, wherein the determining a hierarchical feature of the image frame and a reference frame corresponding to the image frame based on the group of pictures comprises:

determining a picture group feature of the group of pictures; and determining a hierarchical feature of the image frame and a reference frame corresponding to the image frame based on a picture group reference relationship in the picture group feature.

12. The method according to claim 10, wherein the performing differential analysis on the image frame and the reference frame to obtain a differential feature of the image frame relative to the reference frame comprises:

determining matching image blocks respectively corresponding to original image blocks in the image frame from the reference frame;

obtaining motion information respectively corresponding to the original image blocks according to positions of the original image blocks and positions of the corresponding matching image blocks; and obtaining a motion feature of the image frame relative to the reference frame based on the motion information respectively corresponding to original image blocks.

13. The method according to claim 12, wherein the motion information comprises first displacements of the original image blocks in the image frame in an image width direction, and second displacements of the original image blocks in the image frame in an image height direction; and the obtaining a motion feature of the image frame relative to the reference frame based on the motion information respectively corresponding to the original image blocks comprises:

performing summation on the first displacements of the original image blocks, and obtaining a first displacement ratio based on a ratio of the obtained first displacement sum to an image width of the image frame;

performing summation on the second displacements of the original image blocks, and obtaining a second displacement ratio based on a ratio of the obtained second displacement sum to an image height of the image frame;

obtaining an intermediate motion feature according to a ratio of a displacement ratio sum of the first displacement ratio and the second displacement ratio to a quantity of original image blocks; and obtaining a motion feature of the image frame relative to the reference frame according to a ratio of the intermediate motion feature to an image distance, the image distance comprising a distance between the reference frame and the image frame.

14. The method according to claim 8, wherein the performing differential analysis on the image frame and the reference frame to obtain a differential feature of the image frame relative to the reference frame comprises:

determining matching image blocks respectively corresponding to original image blocks in the image frame from the reference frame;

obtaining residual information respectively corresponding to the original image blocks according to pixels of the original image blocks and pixels of the corresponding matching image blocks; and obtaining a residual feature of the image frame relative to the reference frame based on the residual information respectively corresponding to the original image blocks and a quantity of original image blocks.

15. The method according to claim 14, wherein the residual information comprises pixel residual absolute values of the original image blocks, and a pixel residual absolute value of an original image block is obtained according to pixel differences between the pixels in the original image block and a corresponding matching image block; and the obtaining a residual feature of the image frame relative to the reference frame based on the residual information respectively corresponding to the original image blocks and a quantity of original image blocks comprises:

performing summation on the pixel residual absolute values of the original image blocks to obtain a sum of absolute differences of residuals; and obtaining a residual feature of the image frame relative to the reference frame according to a ratio of the sum of absolute differences of residuals to the quantity of original image blocks.

16. The method according to claim 1, further comprising:

performing, in response to that the hierarchical feature of the image frame does not satisfy the parallel processing condition, compression analysis on the image frame by a non-wavefront parallel processing method to obtain an encoding parameter for the image frame.

17. A video compression apparatus, comprising:

at least one memory and at least one processor, the at least one memory storing a computer-readable instruction that, when executed by the at least one processor, implements:

acquiring a video to be compressed;

determining encoding parameters respectively corresponding to a plurality of image frames in the video, comprising: for an image frame of a plurality of image frames:

determining an adaptive mapping parameter and a result limit range, the result limit range being obtained based on a picture group feature of a group of pictures to which the image frame belongs;

performing adaptive mapping on the image frame based on a differential feature of the image frame relative to a corresponding reference frame according to the adaptive mapping parameter, to obtain a differential feature mapping result;

adjusting the differential feature mapping result based on the result limit range to obtain a mapping result within the result limit range;

determining a parallel processing condition corresponding to the image frame according to the mapping result; and performing, in response to that a hierarchical feature of the image frame satisfies the parallel processing condition, parallel compression analysis on image encoding units in the image frame to obtain an encoding parameter for the image frame, the image encoding units being obtained by performing unit division on the image frame; and

compressing the video based on the encoding parameters respectively corresponding to the plurality of image frames in the video.

18. The apparatus according to claim 17, wherein determining the parallel processing condition corresponding to the image frame according to the mapping result comprises:

determining a parallel processing threshold according to the mapping result, and generating the parallel processing condition corresponding to the image frame based on the parallel processing threshold.

19. The apparatus according to claim 17, wherein the differential feature comprises a motion feature and a residual feature; the adaptive mapping parameter comprises a motion feature mapping parameter and a residual feature mapping parameter; and the performing adaptive mapping on the differential feature of the image frame relative to the corresponding reference frame according to the adaptive mapping parameter to obtain a differential feature mapping result comprises:

performing adaptive mapping on the motion feature according to the motion feature mapping parameter to obtain a motion feature mapping result;

performing adaptive mapping on the residual feature according to the residual feature mapping parameter to obtain a residual feature mapping result; and obtaining the differential feature mapping result based on the motion feature mapping result and the residual feature mapping result.

20. A non-transitory computer-readable storage medium, storing a computer-readable instruction that, when executed by at least one processor, causing the at least one processor to perform:

acquiring a video to be compressed;

determining encoding parameters respectively corresponding to a plurality of image frames in the video, comprising: for an image frame of a plurality of image frames:

determining an adaptive mapping parameter and a result limit range, the result limit range being obtained based on a picture group feature of a group of pictures to which the image frame belongs;

performing adaptive mapping on the image frame based on a differential feature of the image frame relative to a corresponding reference frame according to the adaptive mapping parameter, to obtain a differential feature mapping result;

adjusting the differential feature mapping result based on the result limit range to obtain a mapping result within the result limit range;

determining a parallel processing condition corresponding to the image frame according to the mapping result; and performing, in response to that a hierarchical feature of the image frame satisfies the parallel processing condition, parallel compression analysis on image encoding units in the image frame to obtain an encoding parameter for the image frame, the image encoding units being obtained by performing unit division on the image frame; and compressing the video based on the encoding parameters respectively corresponding to the plurality of image frames in the video.

* * * * *